US010650638B2

(12) United States Patent
Nakamura

(10) Patent No.: US 10,650,638 B2
(45) Date of Patent: May 12, 2020

(54) GAMING MACHINE, GAME PROVIDING METHOD, AND NON-TRANSITORY COMPUTER READABLE MEDIUM

(71) Applicants: Konami Gaming, Incorporated, Las Vegas, NV (US); Daisuke Nakamura, Zama-shi (JP)

(72) Inventor: Daisuke Nakamura, Zama (JP)

(73) Assignee: Konami Gaming, Incorporated, Las Vegas, NV (US)

(*) Notice: Subject to any disclaimer, the term of this patent is extended or adjusted under 35 U.S.C. 154(b) by 0 days.

(21) Appl. No.: 15/502,987

(22) PCT Filed: Aug. 6, 2015

(86) PCT No.: PCT/JP2015/072381

§ 371 (c)(1),
(2) Date: Feb. 9, 2017

(87) PCT Pub. No.: WO2016/024522

PCT Pub. Date: Feb. 18, 2016

(65) Prior Publication Data

US 2017/0236383 A1 Aug. 17, 2017

(30) Foreign Application Priority Data

Aug. 11, 2014 (JP) ................................ 2014-163786

(51) Int. Cl.

| | |
|---|---|
| ***A63F 13/00*** | (2014.01) |
| ***G07F 17/32*** | (2006.01) |
| ***G07F 17/34*** | (2006.01) |

(52) U.S. Cl.
CPC ...... *G07F 17/3267* (2013.01); *G07F 17/3213* (2013.01); *G07F 17/3239* (2013.01); *G07F 17/34* (2013.01)

(58) Field of Classification Search
CPC ..... G07F 17/34; G07F 17/3213; G07F 17/326
See application file for complete search history.

(56) References Cited

U.S. PATENT DOCUMENTS

| | | | | |
|---|---|---|---|---|
| 2004/0053673 A1* | 3/2004 | Mishra | G07F 17/3244 | 463/20 |
| 2008/0200238 A1* | 8/2008 | Mishra | G07F 17/3244 | 463/20 |

(Continued)

FOREIGN PATENT DOCUMENTS

| | | |
|---|---|---|
| JP | 2002-102535 A | 4/2002 |
| JP | 2004-160195 A | 6/2004 |

(Continued)

OTHER PUBLICATIONS

International Search Report (PCT/JP2015/072381); dated Oct. 27, 2015.

(Continued)

*Primary Examiner* — Omkar A Deodhar
*Assistant Examiner* — Eric M Thomas
(74) *Attorney, Agent, or Firm* — Howard & Howard Attorneys PLLC

(57) ABSTRACT

When a predetermined condition is satisfied, the gaming machine 1 replaces some of the plurality of reels 61 displayed on the display unit 27 with a special reel 62 having a symbol arrangement different from the reels 61 from when the reels 61 start to spin to when the game result is formed.

11 Claims, 15 Drawing Sheets

(56) References Cited

U.S. PATENT DOCUMENTS

| | | | | |
|---|---|---|---|---|
| 2009/0137309 | A1* | 5/2009 | Thomas | G07F 17/3211 463/20 |
| 2010/0124969 | A1* | 5/2010 | Hughes | G07F 17/3265 463/20 |
| 2011/0263311 | A1 | 10/2011 | Shiraishi | |
| 2012/0172106 | A1 | 7/2012 | Caputo et al. | |
| 2013/0059642 | A1* | 3/2013 | Gilmore | G07F 17/326 463/20 |
| 2013/0184050 | A1* | 7/2013 | Zoble | G07F 17/3213 463/20 |

FOREIGN PATENT DOCUMENTS

| | | | |
|---|---|---|---|
| JP | 2004-173950 | A | 6/2004 |
| JP | 2008-136577 | A | 6/2008 |
| JP | 2009-100799 | A | 5/2009 |
| JP | 2013-524933 | A | 6/2013 |
| WO | 2011/133241 | A1 | 10/2011 |

OTHER PUBLICATIONS

International Preliminary Report on Patentability (WO Patent Application No. PCT/JP2015/072381); dated Feb. 23, 2017; 8 pages.

Office Action (JP Patent Application No. 2016-542553); Dispatch dated Apr. 9, 2019; 3 pages.

Office Action (JP Patent Application No. 2016-542553); Dispatch dated Dec. 3, 2019; 3 pages.

* cited by examiner (a) (b) (c)

GAMING MACHINE, GAME PROVIDING METHOD, AND NON-TRANSITORY COMPUTER READABLE MEDIUM

CROSS REFERENCE TO RELATED APPLICATION

This application is a national stage application of PCT/JP2015/072381, filed Aug. 6, 2015, which claims priority to Japanese Patent Application No. 2014-163786, filed Aug. 11, 2014, the disclosures of which are hereby incorporated by reference in their entirety.

TECHNICAL FIELD

The present invention relates to a gaming machine, a game providing method, and a program.

BACKGROUND ART

Gaming machines such as slot machines are popular among casino customers as devices through which customers can easily enjoy gambling and recent statistics indicate that income from gaming machines accounts for at least half of casino income. Early slot machines were simple devices that received inserted coins, and spun and stopped mechanical reels according to a handle operation, with a win or a loss determined according to a combination of symbols stopped on a single pay line. However, recent gaming machines have increased in sophistication to include mechanical slot machines in which physical reels are driven with high precision using computer-controlled stepping motors, video slot machines in which virtual reels are displayed on a display connected to a computer, and various gaming machines in which similar technology is applied to other casino games. For manufacturers developing these gaming machines, improving the functionality of gaming machines and providing highly attractive games that attract casino customers to play are important areas of focus.

In view of this background, a game machine that changes the symbol arrangement of a reel used for providing a normal game to a different symbol arrangement at the start of a free game provided without consuming any game value has been proposed. For example, the Patent Literature 1 discloses a slot machine in which when a normal game is provided, this slot machine uses reels having a symbol arrangement in which various types of symbols are randomly arranged and when a free game is started, this slot machine changes the reels into reels having a special symbol arrangement in which the same type of symbols are arranged to be adjacent to each other. In such a slot machine, the reels having special symbols arranged adjacent to each other are used when a free game is provided, therefore, the slot machine can increase the chance of winning based on the special symbols during the free game. In addition, since the special symbols arranged adjacent to each other are shown to the player, this can suggest a high level of winning expectation value, which enhances the expectation of the player in the free game.

CITATION LIST

Patent Literature

Patent Literature 1: Japanese Unexamined Patent Publication No. 2009-100799.

SUMMARY OF INVENTION

Technical Problem

However, the slot machine described in the Patent Literature 1 is configured to change the symbol arrangement of the reels when a free game is newly started after the normal game, and the change of the symbol arrangement is performed with fixed timing, e.g., at the start of the free game, and therefore, the slot machine does not provide a player with development of a game having an unexpectedness. In other words, the value added by changing the symbol arrangement disclosed in Patent Literature 1 is limited to the improvement of the player's expectation in the free game, and it has not yet provided any added value beyond that.

Various aspects of the present invention have been made in view of the above circumstances, it is an object of the present invention to provide a gaming machine, a game providing method, and a program that provide a game that progresses with a development that is difficult to be predicted by a player.

Solution to Problem

To solve the above-mentioned problem, a gaming machine according to one aspect of the present invention includes: an operation unit configured to receive an operation by a player; a display unit configured to display a plurality of reels each having a symbol arrangement constituted by predetermined symbols; and a controller connected to the operation unit and the display unit and configured to form a combination of symbols as a game result by spinning and stopping the plurality of reels on the display unit when the operation unit receives the operation by the player, and to provide an award for the formed game result, wherein when a predetermined condition is satisfied, the controller replaces some of the plurality of reels displayed on the display unit with a special reel having a symbol arrangement different from the reels from when the reels start to spin to when the game result is formed.

In addition, a game providing method according to one aspect of the present invention is a game providing method using a gaming machine including an operation unit configured to receive an operation by a player; a display unit configured to display a plurality of reels each having a symbol arrangement constituted by predetermined symbols; and a controller connected to the operation unit and the display unit and configured to form a combination of symbols as a game result by spinning and stopping the plurality of reels on the display unit when the operation unit receives the operation by the player, and to provide an award for the formed game result, wherein when a predetermined condition is satisfied, the controller replaces some of the plurality of reels displayed on the display unit with a special reel having a symbol arrangement different from the reels from when the reels start to spin to when the game result is formed.

In addition, a program according to one aspect of the present invention is a program executed by a computer connected to an operation unit configured to receive an operation by a player and a display unit, wherein the program causes the computer to function as a controller configured to display a plurality of reels each having a symbol arrangement constituted by predetermined symbols, form a combination of symbols as a game result by spinning and stopping the plurality of reels on the display unit when the operation unit receives the operation by the player, and provide an award for the formed game result, and when a predetermined condition is satisfied, the controller replaces some of the plurality of reels displayed on the display unit with a special reel having a symbol arrangement different from the reels from when the reels start to spin to when the game result is formed.

Advantageous Effects of Invention

According to one aspect of the present invention, a gaming machine, a game providing method, and a program that provide a game that progresses with a development that is difficult to be predicted by a player are provided.

DESCRIPTION OF EMBODIMENTS

Figure 1:
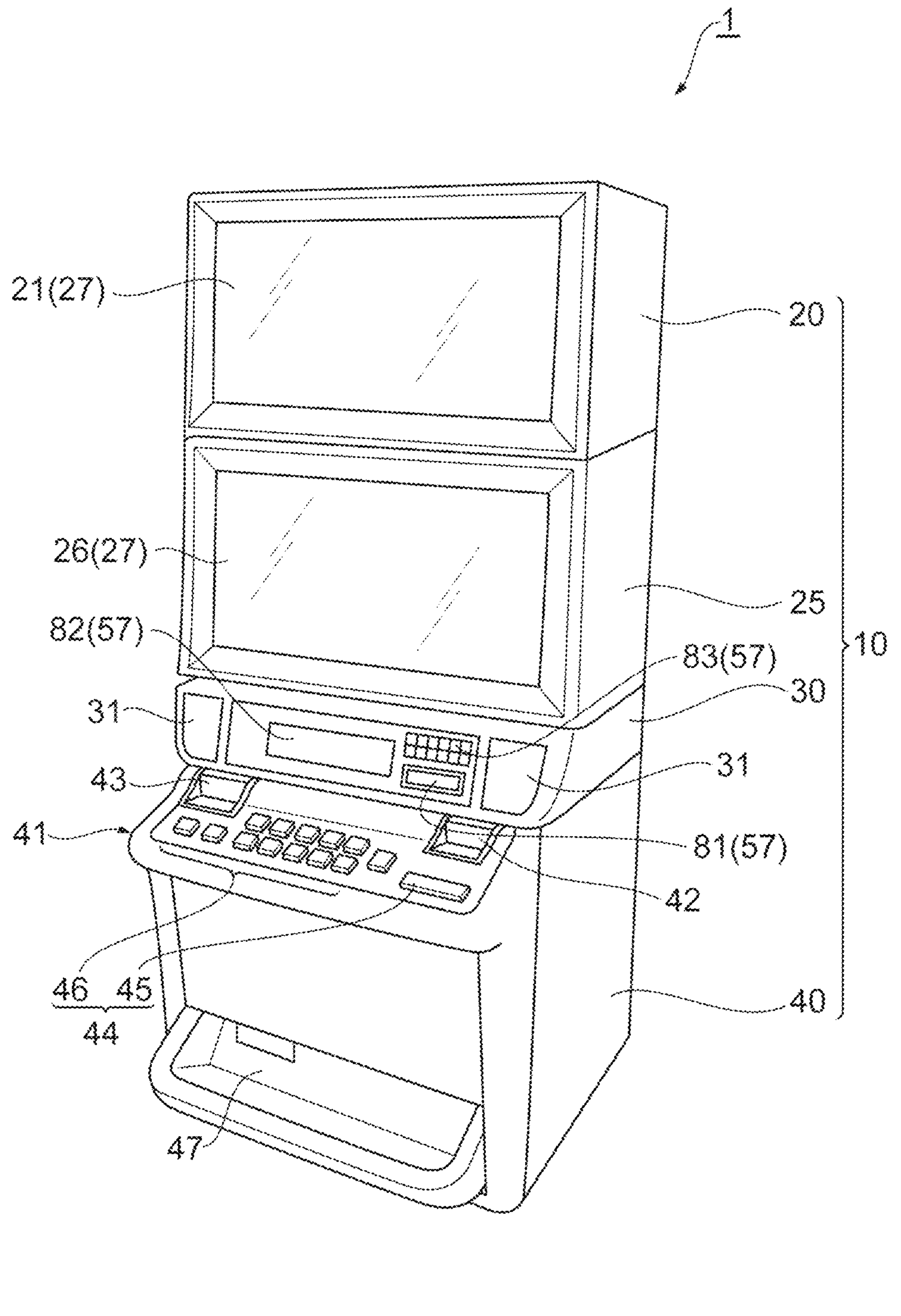
FIG. 1 is a perspective view illustrating a gaming machine according to one embodiment.

Hereinafter, a gaming machine according to one embodiment of the present invention will be described with reference to the accompanying drawings. It should be noted that identical reference signs are assigned to identical or equivalent elements in the drawings, and redundant descriptions thereof will be omitted.

The gaming machine of this embodiment receives a predetermined game value from a player, generates a game result, and provides the player with an award according to the game result. FIG. 1 is a perspective view illustrating a gaming machine 1 of this embodiment. As illustrated in FIG. 1, the gaming machine 1 includes a housing 10 including a first cabinet 20 with an upper display 21, a second cabinet 25 with a lower display 26, a third cabinet 30 housing a player tracking unit 57, and a fourth cabinet 40 having a control panel 41 and housing a controller 50 controlling each unit. Each configuration will be hereinafter described.

The upper part of the housing 10 is provided with the first cabinet 20, and the second cabinet 25 is provided below the first cabinet 20. Both of the upper display 21 provided to the first cabinet 20 and the lower display 26 provided to the second cabinet 25 are flat panel display devices such as liquid display devices or organic electroluminescence (EL) display devices, and function as a display unit 27 for providing a player with game screens explained later through control from the controller 50.

The third cabinet 30 is provided under the second cabinet 25. Speakers 31 are provided on the left and right of a front face of the third cabinet 30, and are controlled by the controller 50 to provide sound to the player. In addition, the player tracking unit 57 is housed in the center of the front face of the third cabinet 30. The player tracking unit 57 has a card reader 81 for recognizing a player identification card, a display 82 for presenting information to the player, and a keypad 83 for receiving an input by the player. This player tracking unit 57 operates in cooperation with the controller 50 or an external system to be described to read information recorded on the player identification card inserted into the card reader 81 by the player, and displays the information read from the card or information acquired by communicating with the external system on the display 82. In addition, the input from the player is received by the keypad 83, a display of the display 82 is changed according to the input, and communication with the external system is conducted as necessary.

The fourth cabinet 40 is disposed below the third cabinet 30. The fourth cabinet 40 is provided with the control panel 41 extending partially forward. The control panel 41 is provided with a bill/ticket identification unit 42, a printer unit 43, and an operation unit 44.

The bill/ticket identification unit 42 is disposed in the control panel 41 such that an insertion opening for inserting a bill or ticket is exposed, an identification unit for identifying the bill/ticket using various types of sensors is provided behind the insertion opening, and an exit side of the identification unit inside the fourth cabinet 40 is provided with a bill/ticket storage unit. The bill/ticket identification unit 42 receives and identifies bills, tickets (including vouchers and coupons) which are game values used as a compensation for playing the game, and notifies its reception and identification to the controller 50 described later.

The printer unit 43 is disposed in the control panel 41 such that a ticket output opening from which a ticket is output is exposed, a printing unit for printing predetermined information on printing paper is provided behind the ticket output opening, and a paper entry side of the printing unit is provided with a housing unit housing the printing paper.

The printer unit 43 prints information corresponding to credit payout processing from the gaming machine 1 onto the paper and outputs a ticket, under control of the controller 50 to be described. The output ticket enables the paid credit to be used for playing a game by inserting into a bill/ticket identification unit of another gaming machine or for conversion into cash at a kiosk terminal or casino cage.

The operation unit 44 is a button group for receiving various types of instructions to the gaming machine 1 from the player. The operation unit 44 includes, for example, a spin button 45 and a setting button group 46. The spin button 45 receives an instruction to start a game (start of reel spin), which will be described later. The setting button group 46 includes a bet button group, a line designation button group, a maximum bet button, and a payout button, etc. The bet button group receives an instruction operation regarding an amount of credit (the number of bets) bet by the player. The line designation button group receives an instruction operation from the player designating a line (hereinafter referred to as a validity line) serving as a line judgment target to be described. The maximum bet button receives an instruction operation from the player regarding a bet of a maximum amount of credit that can be bet at one time. The payout button receives an instruction operation from the player to issue a payout instruction for the credit accumulated in the gaming machine 1.

In addition, a control board equipped with a central processing unit (hereinafter abbreviated as CPU) 51, an interface unit 52, a memory 53, a storage 54, and the like configure the controller 50 and this is embedded inside the fourth cabinet 40. The control board is configured to be able to communicate with each of the above-mentioned components mounted in the first cabinet 20, the second cabinet 25, the third cabinet 30, and the fourth cabinet 40, via the interface unit 52, and controls an operation of each component by executing a program recorded on the memory 53 or the storage 54 in the CPU 51, to provide the game to the player.

Figure 2:
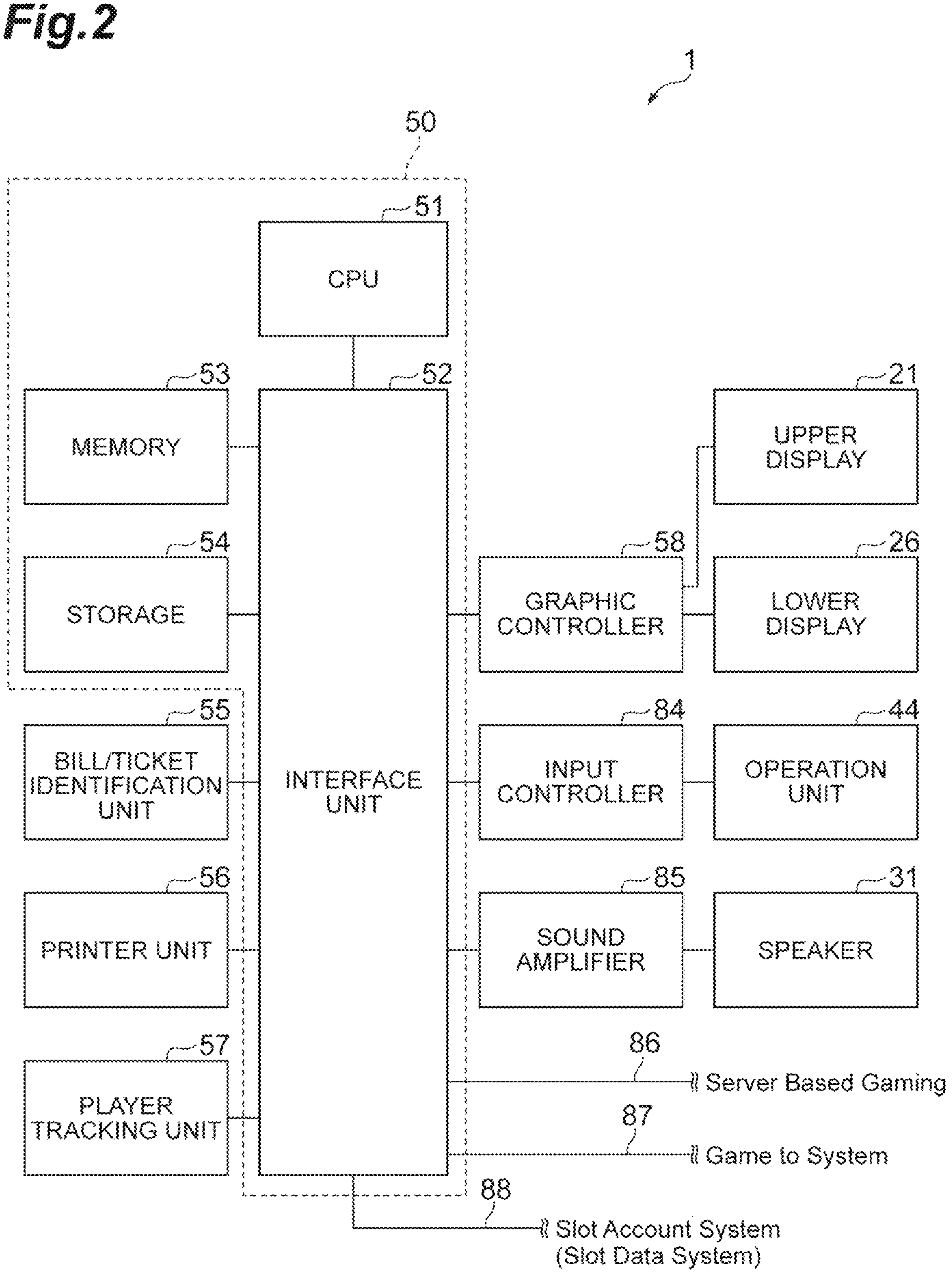
FIG. 2 is a block diagram illustrating a gaming machine of FIG. 1.

FIG. 2 illustrates a functional block diagram of the gaming machine 1 according to this embodiment. The gaming machine 1 includes the controller 50. The controller 50 is configured as a computer unit including a CPU 51, an interface unit 52 connected to the CPU 51 and having a chip set for providing communication functions of a memory bus, various types of expansion buses, a serial, a Universal Serial Bus (USB), and Ethernet (registered trademarks), etc., and a memory 53 and a storage 54 to which the CPU 51 can refer via the interface unit 52. The memory 53 can be configured to include a random access memory (RAM), which is volatile storage medium, a read only memory (ROM), which is a nonvolatile storage medium, or an electrically erasable programmable ROM (EEPROM), which is a rewritable nonvolatile storage medium. The storage 54 functions as an external storage device for the controller 50. A reading device such as a memory card and a magneto-optic disc, which are removable storage mediums, or a hard disk may be used as the storage 54.

The bill/ticket identification unit 55, the printer unit 56, the player tracking unit 57, a graphic controller 58, an input controller 84, and a sound amplifier 85 are connected to the interface unit 52 in addition to the CPU 51, the memory 53, and the storage 54. In the case where the gaming machine 1 is provided with illumination to provide decorative lighting, an illumination controller which provides decorative lighting effects by controlling the illumination under control of the controller 50 may be connected to the interface unit 52.

The controller 50 having the memory 53 and the storage 54 as described above controls each unit by executing a program stored in the memory 53 and the storage 54, and provides the game to the player. A configuration may be adopted here, for example, wherein programs and data of an operating system and a subsystem for providing a basic function of the controller 50 are stored in the EEPROM of the memory 53, and a program and data of an application for providing the game are stored in the storage 54. Adopting such a configuration makes it possible to easily switch or update the game by exchanging the storage 54. It should be noted that the controller 50 may also be configured as a multiprocessor having a plurality of CPUs.

Each block connected to the controller 50 will be described hereafter.

The bill/ticket identification unit 55 corresponds to the bill/ticket identification unit 42 described above. The bill/ticket identification unit 55 is a component that receives a bill or a ticket through the insertion opening identifies a type of the bill or information corresponding to the credit payout processing, and notifies the identified information to the controller 50. When the bill/ticket identification unit 55 notifies the controller 50 of the above information, the controller 50 increases the credit amount available in the game according to content of the notification. The printer unit 56 corresponds to the above-described printer unit 43, and the printer unit 56 prints a ticket printed with the information corresponding to the credit payout processing from the gaming machine 1 and outputs the ticket under control of the controller 50 receiving the operation of the payout button in the setting button group 46 described above.

The player tracking unit 57 operates in cooperation with the controller 50 to transmit and receive information about the player and the like to and from the casino management system. The graphic controller 58 controls the upper display 21 and the lower display 26 to display screen images including various types of graphic data under control of the controller 50. The sound amplifier 85 drives the speaker 31 to provide various types of sounds such as announcements, sound effects, background music (BGM) and the like under control of the controller 50.

In addition, the interface unit 52 includes various types of communication interfaces for communicating outside the gaming machine 1 and, for example, can communicate with an external network using Ethernet connections 86 and 87 and a serial output 88. In this embodiment, one example is shown wherein communication is conducted with a known server-side gaming network (Server Based Gaming of FIG. 2), a G2S network (Game to System of FIG. 2), and a slot information system (Slot Data System of FIG. 2), respectively.

Figure 3:
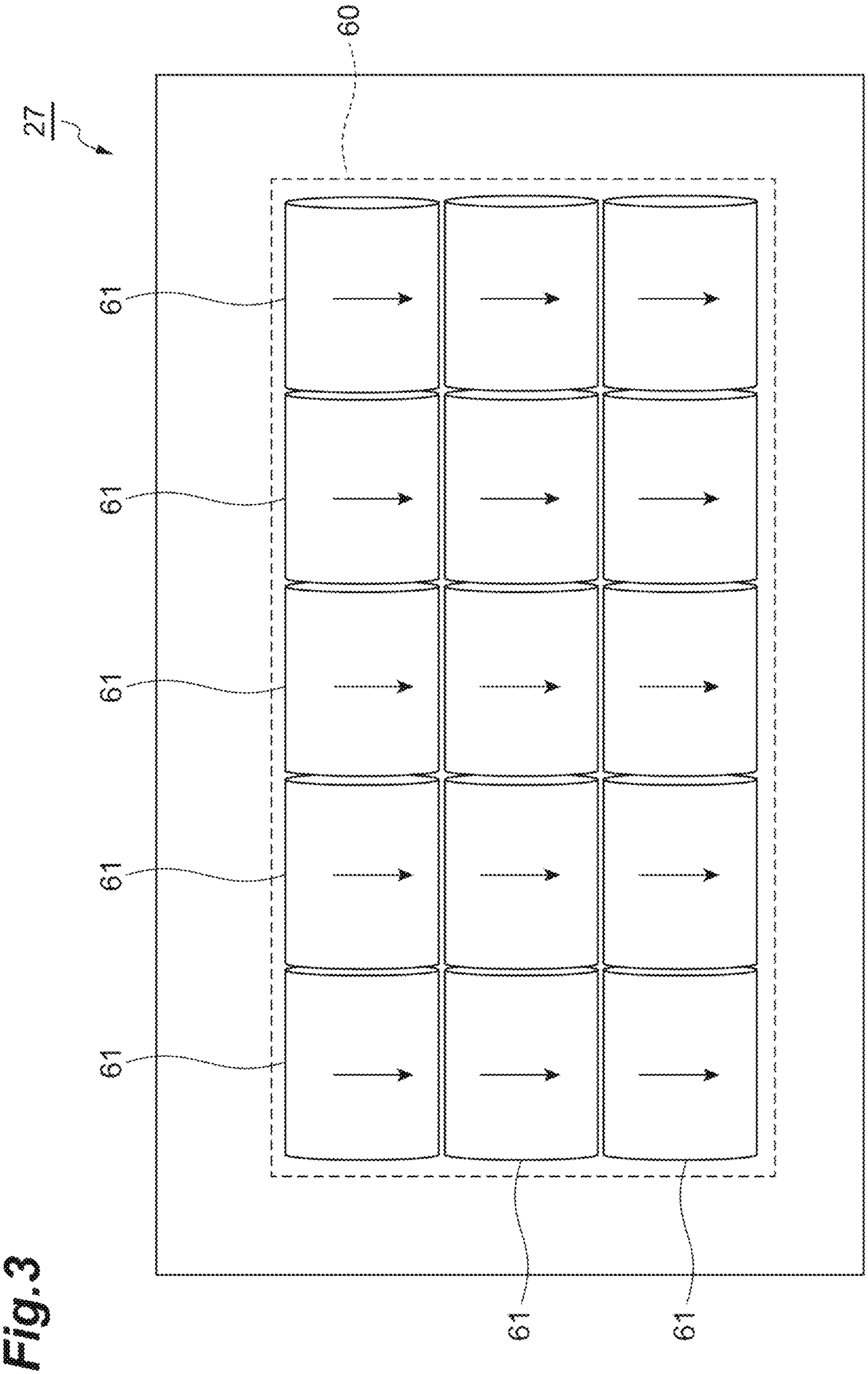
FIG. 3 is a diagram schematically illustrating a game screen provided by the gaming machine of FIG. 1.

FIG. 3 is a diagram schematically illustrating a game screen provided by the gaming machine 1 of this embodiment. Such a game screen is displayed on the display unit 27 (the upper display 21 and/or the lower display 26) when the controller 50 executes a predetermined program. This embodiment illustrates an aspect in which the game screen is displayed on the lower display 26. As illustrated in FIG. 3, this game screen has a symbol display area 60 for displaying a plurality of virtual reels and symbols included in the reels. By using the game screen, the gaming machine 1 of this embodiment operates as a slot machine virtually spinning and stopping a plurality of reels displayed on the symbol display area 60 in exchange for the predetermined game value, forming a combination of symbols as a game result, and providing an award according to a winning combination of the symbols included in the game result.

Also, although omitted in FIG. 3, it is possible to provide the display unit 27 with an area displaying the credit amount, the number of bets, a credit amount (the number of WINs) obtained by winning, and the like, as well as a decoration area, in addition to the symbol display area 60.

In this embodiment, for example, the reels 61 are arranged in a lattice pattern with 3 rows and 5 columns in the rectangular symbol display area 60. In the following description, the horizontal direction of the display unit 27 may be referred to as a row direction, and the vertical direction may be referred to as a column direction. An area where each reel 61 of the symbol display area 60 is displayed (each area in a lattice pattern having 3 rows and 5 columns) may also be called a cell.

Figure 4:
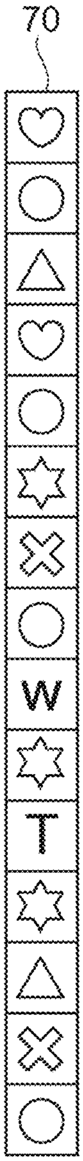
FIG. 4 is a diagram illustrating an example of a symbol arrangement included in the reels of FIG. 3.

Each reel 61 has a symbol arrangement constituted by predetermined symbols. More specifically, a virtual reel strip 70 as illustrated in FIG. 4 is associated with each reel 61. In this case, the virtual reel strip 70 is a data structure used by the program that the controller 50 has in the memory 53 or the storage 54, and expresses a state in which a plurality of symbols are arranged in a line as illustrated in FIG. 4. The symbol arrangement of the virtual reel strip 70 may be individually defined for each reel 61. That is, the virtual reel strips 70 having a different symbol arrangement from each other may be associated with reels 61.

Symbols of virtual reel strip 70 associated with each reel 61 are partially displayed in each cell of the symbol display area 60. More specifically, the reel 61 of this embodiment is a cylindrical object which has two symbols arranged in succession on the surface thereof and the axial direction of which is the horizontal direction of the screen. Each reel 61 displays one symbol while the reel 61 is stopped at each cell. When the reel 61, i.e., the cylindrical object, is spun in the upward direction or the downward direction of screen around the axial direction, symbols change in each cell of the symbol display area 60. At this occasion, the symbols arranged on the surface of the cylindrical object are sequentially replaced according to the symbol arrangement defined in the virtual reel strip 70.

The controller 50, which started the game, spins and stops each of the reels 61. More specifically, the controller 50 uses the display unit 27 (for example lower display 26) to express an operation of randomly determining a stop position for the virtual reel strip 70 associated with each reel 61, and starting spin of the virtual reel strip 70 from the current position and stops the spin at the stop position. As a result, in each cell of the symbol display area 60, the reel 61, i.e., the cylindrical object, spins while sequentially changing the symbols according to the symbol arrangement of the virtual reel strip 70 associated with each reel 61, and the reel 61 is stopped so that one symbol is displayed in the cell. After all the reels 61 are stopped, 15 symbols are displayed in a lattice pattern having 3 rows and 5 columns in the symbol display area 60.

Figure 5:
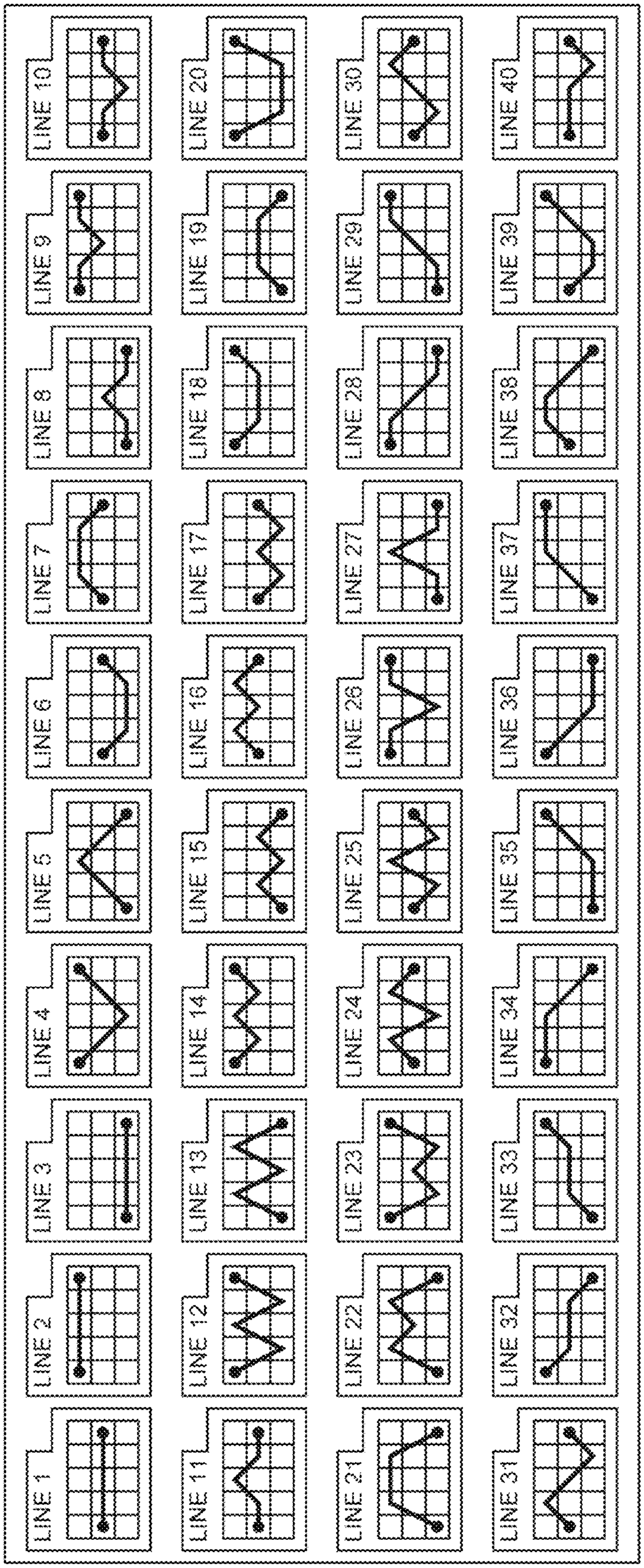
FIG. 5 is a diagram illustrating an example of pay lines set in a symbol display area.

Pay line to be used when determining a winning is set in the symbol display area 60. The pay line is a line set so as to span from the cell of a leftmost column to the cell of a rightmost column, and is obtained by combining a plurality of cells serving as winning determination targets. The number of valid lines from among the set pay lines is selected by the player through an operation of the line designation button group included in the setting button group 46 of the operation unit 44. The controller 50 makes a determination with regard to a combination of symbols as a game result (hereinafter simply referred to as "game result"), and determines that the player wins, for example, when identical symbols exceeding a predetermined number of identical symbols are align on the set pay line, and provide the player with an award according to the types and number of symbols. In the gaming machine 1 of this embodiment, a predetermined number of pay lines (LINE 1 to LINE 40) are set for cells of 3 rows and 5 columns in the symbol display area 60 (see FIG. 5). The method of the winning determination may be a method for determining that the player wins when a predetermined number of identical symbols are align on the predetermined pay line from the cell in the leftmost column, a method for determining that the player wins when a predetermined number of identical symbols are align on the predetermined pay line from the cell in the rightmost column, or a method for determining that the player wins when a predetermined number of identical symbols are align on any columns adjacent to each other on the predetermined pay line.

A boundary line of cells (i.e., a virtual boundary line separating two adjacent reels 61) may be displayed on the display unit 27 in such a manner that the player can visually recognize the boundary line. Alternatively, the boundary line may not be displayed. More specifically, it is sufficient to logically or conceptually define the cells 64 inside the gaming machine 1 as the symbol stop positions, and the boundaries of the symbols need not be necessarily visible.

The gaming machine 1 of this embodiment provides two types of games, e.g., a normal game (which may also be referred to as a main game, a base game, and a primary game) provided when a predetermined condition is not satisfied and a special game (which may also be referred to as a bonus game and a feature game, and include a free game provided without consuming any game value) provided when the predetermined condition is satisfied.

Next, the reel replacement processing of this embodiment, which is performed from when a plurality of reels 61 start to spin to when a game result is formed, will be described with reference to FIGS. 6 to 12.

Figure 6:
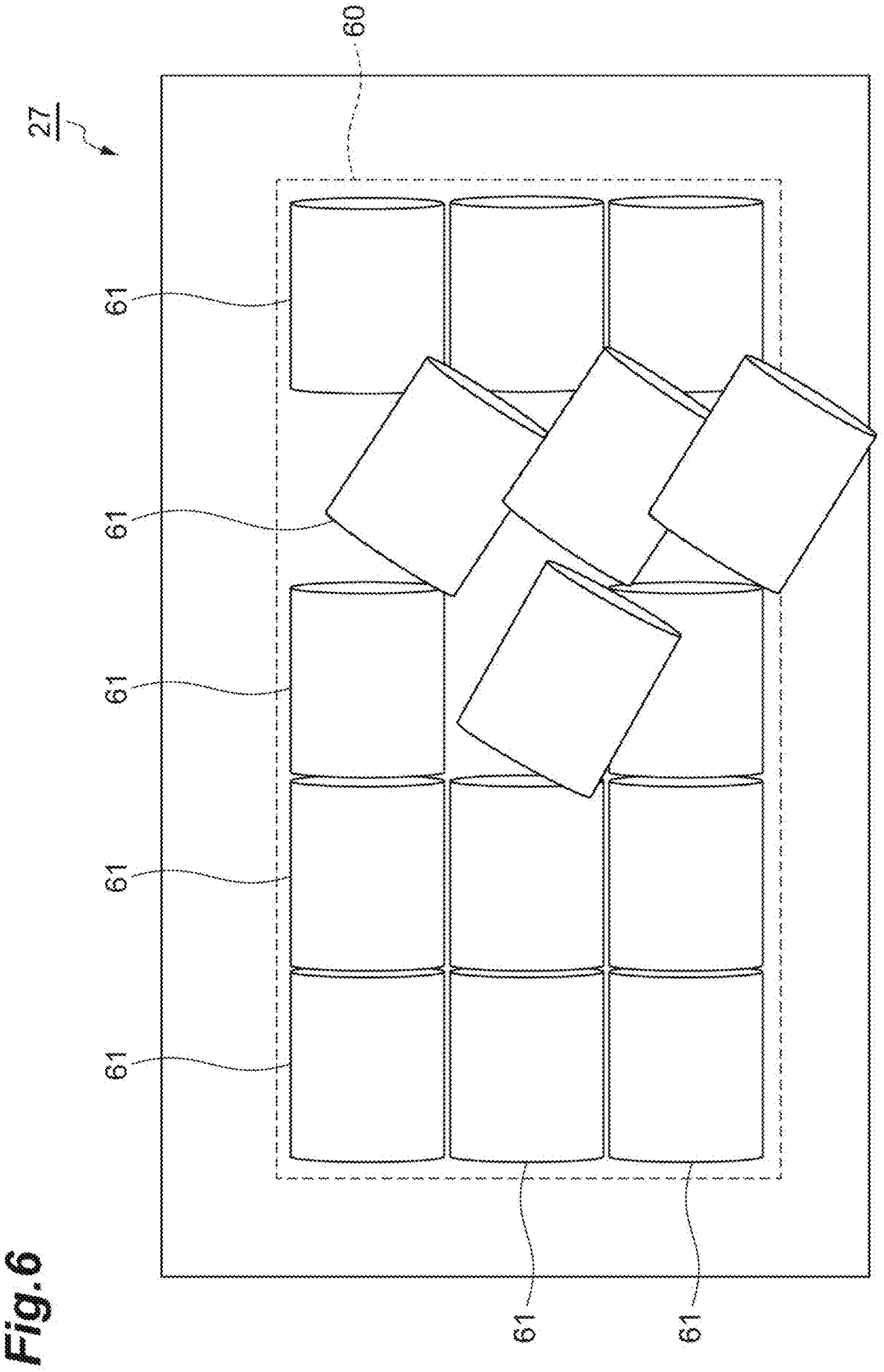
FIG. 6 is a diagram illustrating an example of a display effect in reel replacement processing.
Figure 7:
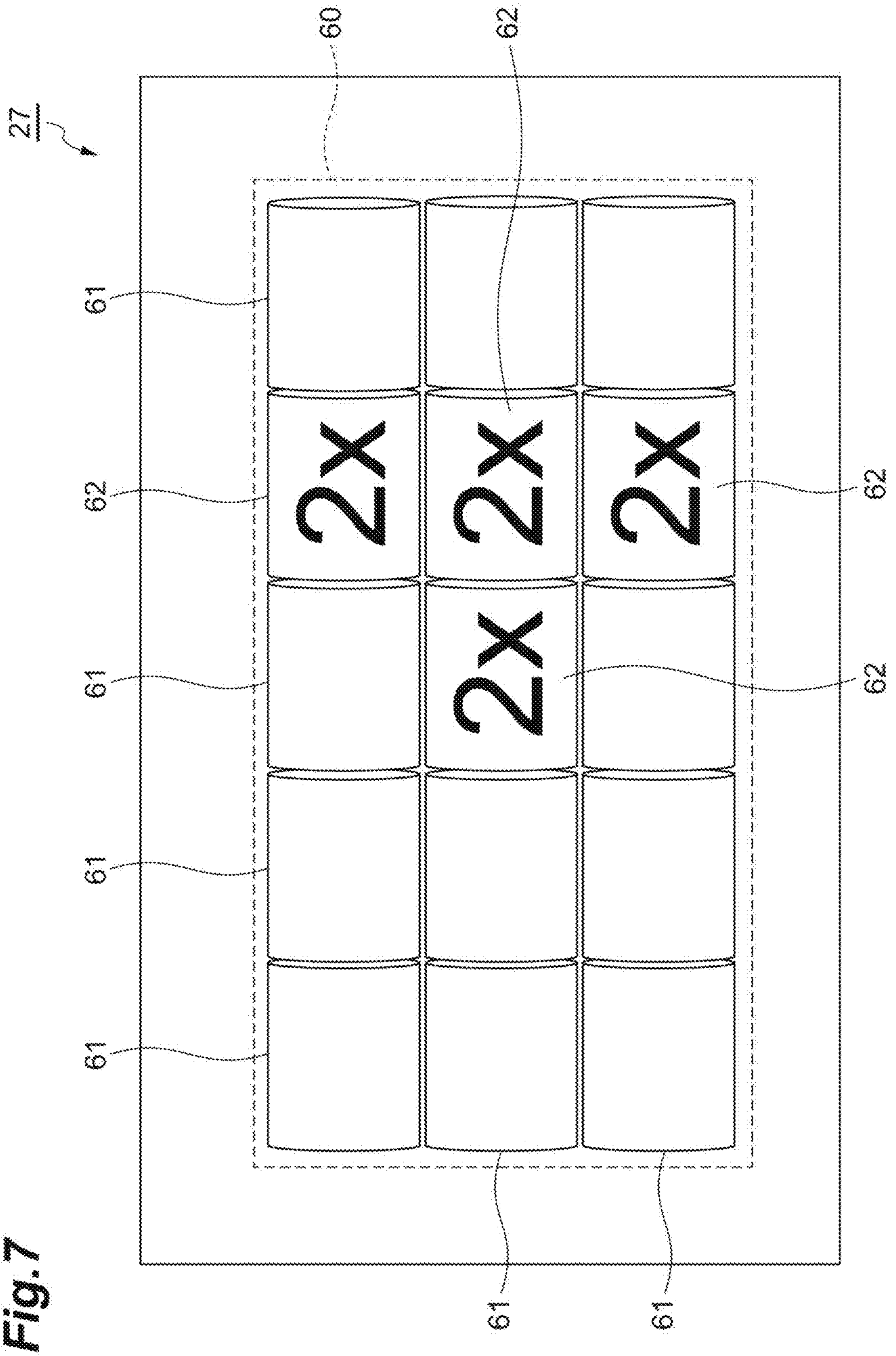
FIG. 7 is a diagram illustrating an example of a special reel displayed on the symbol display area by the reel replacement processing.

As illustrated in FIG. 6 and FIG. 7, the controller 50 replaces some of the reels 61 with special reels 62 having a symbol arrangement different from the reels 61 from when the plurality of reels 61 start to spin to when a game result is formed in response to satisfying the predetermined condition. The predetermined condition may be a condition defined in advance. Examples of predetermined conditions include a condition that an acquired random number is a predetermined value or included in the predetermined range, a condition that the bet amount exceeds a predetermined value, a condition that the current time is a predetermined time, a condition that the current game number reaches a predetermined game number, a condition that a special game is being provided, a condition that a specific symbol was displayed or is displayed, a combination thereof, and the like. For example, in the following explanation, whether the reel replacement processing is provided or not is determined based on a random number. In this case, the controller 50 acquires a random number in order to determine whether a trigger condition for executing the reel replacement processing is satisfied or not, and determines that the trigger condition is satisfied when the random number is included in the predetermined range. When the trigger condition is determined to be satisfied, the controller 50 further acquires a random number to determine an appearance pattern of the special reels 62 and randomly determines reels of a plurality of reels 61 which are to be replaced with special reels 62. In the determination in this case, for example, a plurality of combinations of reels 61 (or a single reel 61) to be replaced with the special reels 62 may be prepared, and any one of the combinations may be selected by a random number. The determination may be made for all the cells constituting the symbol display area 60 or may be made for each row or column formed by the cells in the symbol display area 60. A random number may be obtained for each of the cells forming the symbol display area 60, and whether to replace a reel 61 with a special reel 62 may be determined for each cell. The controller 50 further acquires a random number and randomly determines the position at which the special reel 62 stops.

In this embodiment, for example, the special reel 62 has a symbol arrangement including only multiplier wild symbols. The multiplier wild symbol is a symbol having both of the functions of a wild symbol and a multiplier symbol. The wild symbol is a symbol that can be used as another symbol in the winning determination described later (i.e., a symbol capable of being used in place of another symbol). The multiplier symbol is a symbol associated with a predetermined multiple that is multiplied by an award for a combination of symbols (winning combination) when the player wins.

Figure 8:
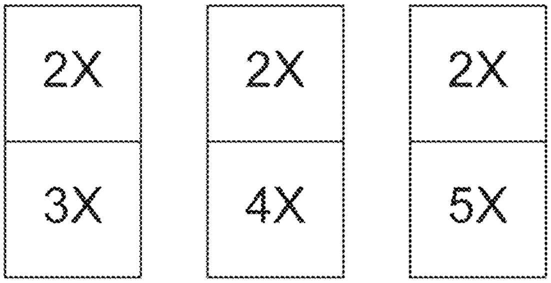
FIG. 8 is a diagram illustrating an example of a virtual reel strip of the special reel.

Also, in this embodiment, for example, the special reel 62 uses a virtual reel strips having the same symbol arrangement, for each column in the symbol display area 60, and the controller 50 determines, for each column, the symbol where the special reel 62 stops. More specifically, in this embodiment, a plurality of special reels 62 in the same column change while the same symbol (multiplier symbol having the same multiple) is displayed, and the special reels 62 stop at the same symbol (multiplier symbol having the same multiple). Accordingly, while any one of the symbols is displayed, the special reel 62 can display the symbol in such a manner that the player can easily visually recognize, so that this allows the player to easily understand that the multiplier of the multiplier symbol changes. Since the multiplier symbol having the same multiple stops at each column of the symbol display area 60, the award calculation becomes easy, and the game that allows the player to easily understand the game result can be provided. In this embodiment, for example, the reels 61 displayed in the cells of the second column, the third column, and the fourth column from the left of the symbol display area 60 may be replaced with special reels 62. (a) of FIG. 8 illustrates an example of a virtual reel strip for a special reel appearing in the cell of the second column from the left. In the virtual reel strip, "2×" indicating a double multiplier symbol and "3×" indicating a triple multiplier symbol are alternately arranged. (b) of FIG. 8 illustrates an example of a virtual reel strip for a special reel appearing in the cell of the third column from the left. In the virtual reel strip, "2×" indicating a double multiplier symbol and "4×" indicating a four-times multiplier symbol are alternately arranged. FIG. 8(*c*) illustrates an example of a virtual reel strip for a special reel appearing in the cell of the fourth column from the left. In the virtual reel strip, "2×" indicating a double multiplier symbol and "5×" indicating a five-times multiplier symbol are alternately arranged. The example of FIG. 7 illustrates four special reels 62 in such a state that all of the four special reels 62 stop with the double multiplier wild symbol "2×".

Although the aspect of the effect of the reel replacement processing is not limited to a particular aspect, but in the present embodiment, a three-dimensional display effect as illustrated in, for example, FIG. 6 and FIG. 7 is executed. More specifically, in the reel replacement processing, first, as illustrated in FIG. 6, the reels 61 (in this example, for example, four reels 61) which are to be replaced with special reels 62 are displayed on the display unit 27 in such a manner that the reels 61 are virtually pushed out to the player's side from the game screen and the reels 61 fall to the lower side of the game screen. Then, as illustrated in FIG. 7, the special reels 62 appearing from the back side of the game screen are placed in the cells in which the four reels 61 were disposed. As a result of such display effect, the reel replacement processing can be presented to the player in a visually impressive manner.

The reel replacement processing may be performed at any point in time from when the plurality of reels 61 start to spin to when a game result is formed. In the present embodiment, for example, the controller 50 executes the reel replacement processing at a point in time before the reels are stopped or after the reels are stopped which will be explained later. In the case where the reel replacement processing is performed at a point in time before the reels are stopped, some of the reels 61 are replaced with special reels 62 while the reels 61 are spinning. In the case where the reel replacement processing is performed at a point in time after the reels are stopped, some of the reels 61 are replaced with special reels 62 after all the reels 61 are stopped.

In the case where the reel replacement processing is executed at a point in time before the reels are stopped, the controller 50 replaces at least one reel 61 with the special reel 62 in the spinning state after the plurality of reels 61 start to spin but before the plurality of reels 61 are stopped. More specifically, in the example of FIG. 6 and FIG. 7, while the plurality of reels 61 are spinning, the four reels 61 determined by the above-described method are replaced with the special reels 62 in the spinning state. Thereafter, the controller 50 stops the reel 61 other than the special reels 62, and then, stops the special reels 62 to form a game result, and provides an award according to the formed game result. According to the reel replacement processing that is performed at a point in time before the reels are stopped, the reels in a combination different from the combination of reels at the time of the start of the spin of the reels (i.e., a combination of the special reel 62 and the reels 61 which are remaining without being replaced with the special reels 62) are spun, so that the progress of the game can be presented to the player in a state different from the state at the start of the game.

In this case, the order for stopping the reels may be in such an order that the reels 61 other than the special reels 62 are stopped first and then the special reels 62 are stopped as described above, or may be in such an order that the special reels 62 are stopped first and thereafter the reels 61 other than the special reels 62 are stopped. In the case, such as this embodiment, where all the symbols included in the special reels 62 are multiplier wild symbols, the following psychological effects can be given to the player by stopping the reels 61 other than the special reels 62 first and then stopping the special reels 62. More specifically, first, when the reels 61 other than the special reels 62 are stopped, the player can grasp whether winning combination can be formed or not. Therefore, in the case where a winning combination can be formed, the player can have an expectation and excitement for winning the game. Subsequently, when the player sees how the multiple of the multiplier symbol changes according to the spin of special reel 62, the player can have greater expectation as to how much the award will be increased. As described above, the above-described order for stopping the reels can enhance, in a stepwise manner, the player's expectation and excitement for winning the game and the expectation as to how much the award will be increased, so that this can effectively improve the player's interest in the game.

In the case where the reel replacement processing is executed at a point in time after the reels are stopped, the controller 50 starts the spin of the plurality of reels 61 and stops the plurality of reels 61, and thereafter, the controller 50 replaces at least one reel 61 with a special reel 62 in the spinning state. More specifically, in the example of FIG. 6 and FIG. 7, after the plurality of reels 61 are stopped, the four reels 61 determined according to the above-described method are replaced with the special reels 62 in the spinning state. Thereafter, the controller 50 stops the special reels 62 to form a game result and provides an award according to the formed game result. According to the reel replacement processing performed at a point in time after the reels are stopped as described above, a game which is displayed as if the game was finished at one time is changed into a different state and the game is further progressed, so that the progress in the game having a high level of unexpectedness can be presented to the player.

The controller 50 may use a random number to randomly determine as to whether the reel replacement processing is executed before the reels are stopped or after the reels are stopped. Alternatively, the controller 50 may select an appropriate point in time in accordance with other situations.

For example, the following explains a case in which the stop position of the reel 61 to be replaced with the special reel 62 is determined to be the position at which a specific symbol advantageous for the player (for example, scatter symbol described later) is displayed. In such a case, in the case where the reel 61 is replaced with the special reel 62 before the reel 61 is stopped, the specific symbol which is supposed to be displayed is not displayed. In this case, treating the effect of the specific symbol not displayed as invalid is disadvantageous for the player. In the case where treating the effect of the specific symbol not displayed as valid and, for example, the player wins a special game as a result of the specific symbol treated as valid, the player cannot understand that the specific symbol was a trigger for winning the special game, which may bring about confusion to the player.

Therefore, in such a case, the controller 50 may execute the reel replacement processing at a point in time after the reels are stopped. More specifically, the controller 50 may temporarily stop the reels 61 and present to the player that the specific symbol is displayed, and thereafter, the controller 50 may replace the reel 61 with the special reel 62. As a result, the player can understand that the specific symbol has been displayed, and even when, e.g., the player wins the special game, the player can enjoy the game without being confused. Furthermore, the controller 50 may present to the player that the effect of the specific symbol is still valid by continuously displaying the specific symbol in such a manner that the specific symbol of the reel 61 determined as a target to be replaced with the special reel 62 is superimposed on the symbol of the special reel 62, so that the player can understand that the effect of the specific symbol is still valid. This makes it possible for the player to more clearly understand that the special symbol was displayed.

Figure 9:
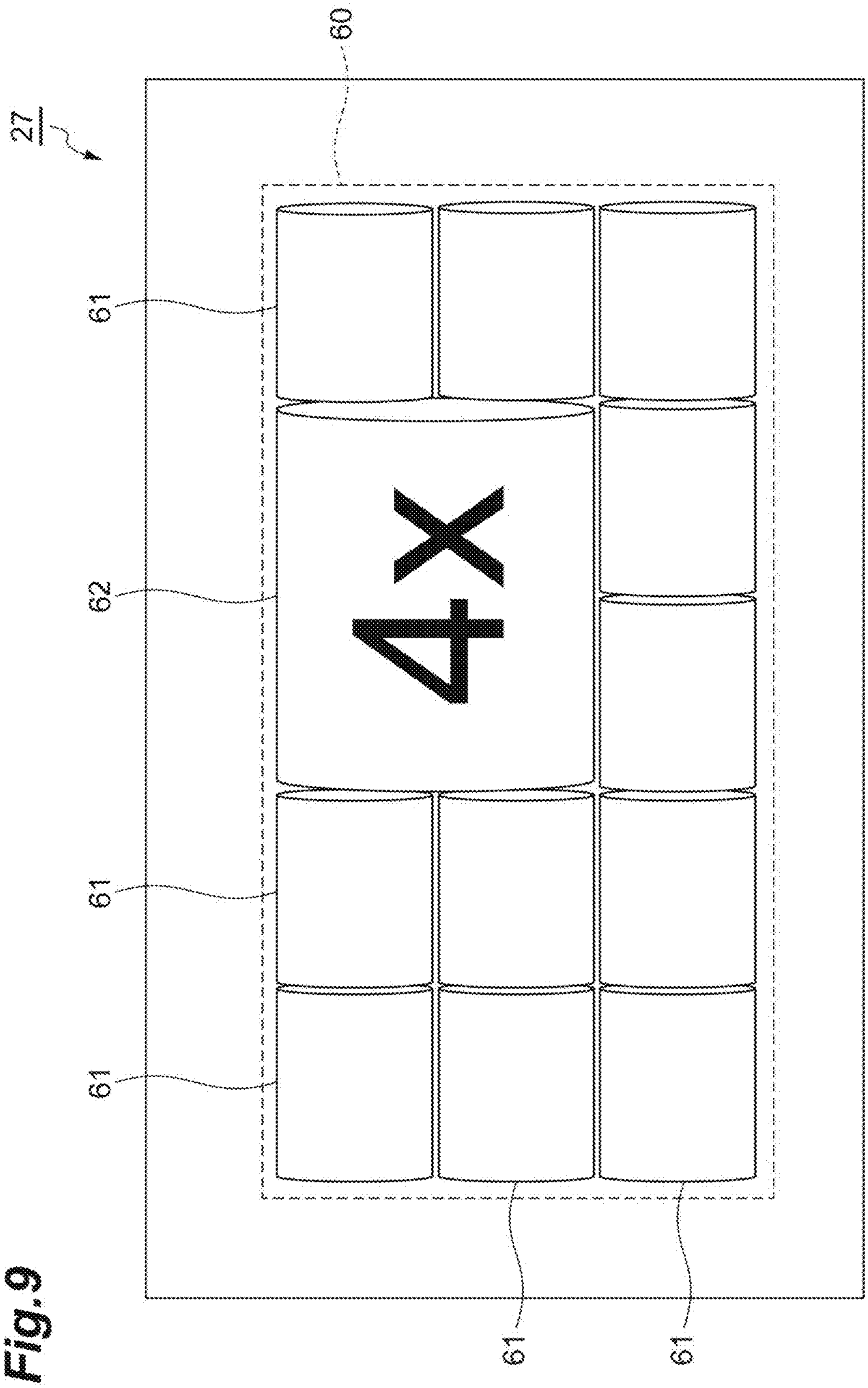
FIG. 9 is a diagram illustrating an example of a large special reel displayed on the symbol display area by the reel replacement processing.

In the case where the plurality of reels 61 to be replaced with the special reels 62 in the reel replacement processing described above are adjacent to each other, the controller 50 may replace the plurality of reels 61 with a special reel 62 having the same size as the plurality of reels 61. For example, as illustrated in FIG. 9, the controller 50 may replace four reels 61 adjacent to each other in an area having 2 rows and 2 columns included in the symbol display area 60 with the special reel 62 having the same size (2 rows and 2 columns) as the four reels 61. In other words, instead of individual special reels (i.e., the reels having the same size as the reels 61) which are replaced with the plurality of reels 61, the controller 50 may display a large special reel 62 (hereinafter also referred to as a large special reel) illustrated in FIG. 9 as a reel obtained by combining the individual special reels in the symbol display area 60. Likewise, as illustrated in FIG. 10, the controller 50 may replace nine reels 61 adjacent to each other in an area having 3 rows and 3 columns included in the symbol display area 60 with a special reel 62 having the same size (3 rows and 3 columns) as the nine reels 61.

As described above, in the case where the plurality of adjacent reels 61 are replaced, the plurality of adjacent reels 61 are replaced with the special reel 62 having the same size as the plurality of adjacent reels 61, so that a visually spectacular progress in the game can be provided by using the large special reel 62. Further, in this case, since the same symbol stops at the position where the large special reel 62 is placed, an exciting game not only being visually impressive but also having a high winning probability can be provided.

Figure 10:
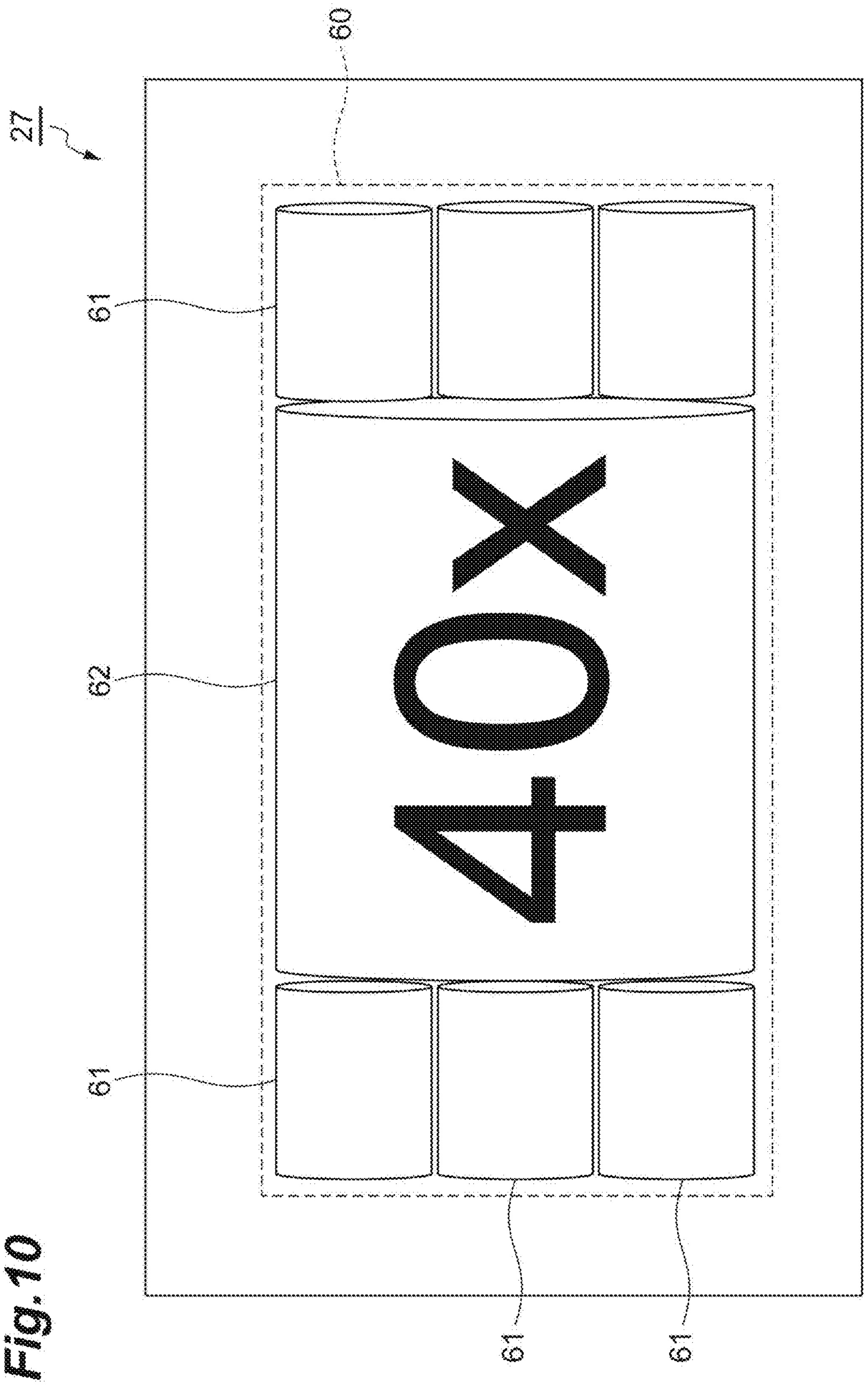
FIG. 10 is a diagram illustrating an example of a large special reel displayed on the symbol display area by the reel replacement processing.

As illustrated in FIG. 9 and FIG. 10, in the present embodiment, for example, the large special reel 62 has a multiplier symbol having a multiple which is a combination of multiples of multiplier symbols included in the special reels 62 which are replaced with the plurality of adjacent reels 61 arranged in the symbol display area 60.

Figure 11:
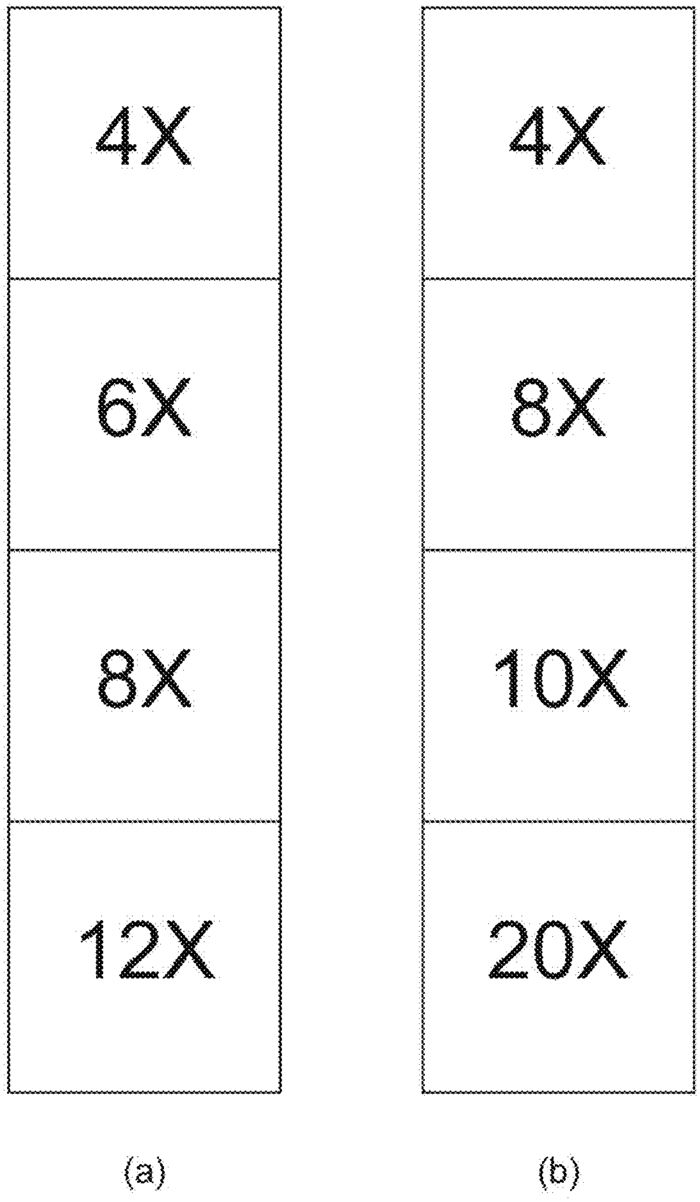
FIG. 11 is a diagram illustrating an example of a virtual reel strip of the large special reel.

(a) of FIG. 11 illustrates a virtual reel strip of a large special reel used instead of individual special reels 62 which are to be replaced with two reels 61 displayed in the second column from the left and two reels 61 displayed in the third column from the left in the symbol display area 60. As illustrated in (a) and (b) of FIG. 8, the special reels 62 replaced with the reels 61 which are displayed in the second column from the left have multiplier symbols for double (2×) and triple (3×), and the special reels 62 replaced with the reels 61 which are displayed in the third column from the left have multiplier symbols for double (2×) and four times (4×). Therefore, combinations of multiplier symbols applied to the pay lines include double (2×) and double (2×); double (2×) and triple (3×); double (2×) and four times (4×); or triple (3×) and four times (4×). To maintain mathematical equivalence with these combinations, the virtual reel strip of the large special reel includes large multiplier symbols indicating four times (4×), six times (6×), eight times (8×), and twelve times (12×).

(b) of FIG. 11 illustrates a virtual reel strip of a large special reel used instead of individual special reels 62 which are to be replaced with two reels 61 displayed in the third column from the left and two reels 61 displayed in the fourth column from the left in the symbol display area 60. As illustrated in (b) and (c) of FIG. 8, combinations of multiplier symbols applied to the pay lines in this case include double (2×) and double (2×); double (2×) and four times (4×); double (2×) and five times (5×); or four times (4×) and five times (5×). To maintain mathematical equivalence with these combinations, the virtual reel strip of the large special reel includes large multiplier symbols indicating four times (4×), eight times (8×), ten times (10×), and twenty times (20×).

Figure 12:
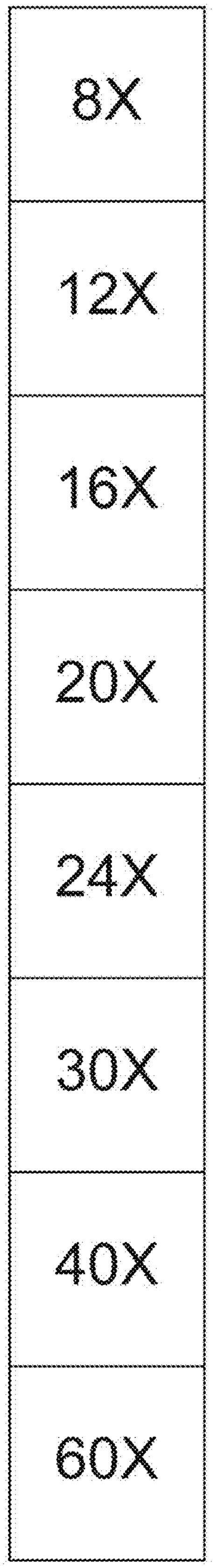
FIG. 12 is a diagram illustrating an example of a virtual reel strip of the large special reel.

Further, FIG. 12 illustrates a virtual reel strip of a large special reel used instead of individual special reels 62 which are to be replaced with three reels 61 displayed in the second column from the left, three reels 61 displayed in the third column from the left, and three reels 61 displayed in the fourth column from the left in the symbol display area 60. To maintain mathematical equivalence with the combinations of the multiplier symbols applied to the pay lines, the virtual reel strip of the large special reel includes large multiplier symbols indicating eight times (8×), twelve times (12×), sixteen times (16×), twenty times (20×), twenty four times (24×), thirty times (30×), forty times (40×), and sixty times (60×).

The position where the large special reel stops is determined to be the position of a large multiplier symbol having a multiple value equivalent to a multiple value obtained by multiplying, by each other, multiples of the multiplier symbols displayed at the stop positions determined for the individual special reels 62. Therefore, the mathematical equivalence can be maintained between the use of the large special reel and the use of the ordinary special reels 62. However, depending on the pay line, only a part of the large special reel described above may contribute to the winning. In this case, it may be possible to apply a multiple of the multiplier symbol that is supposed to be displayed in the special reel 62 at the position contributing to the winning, or apply a multiple of the multiplier symbol displayed in the large special reel as it is.

The example of FIG. 9 illustrates a state in which, for example, in the case where the special reel 62 replacing the reel 61 in the third column from the left is determined to stop with a multiplier symbol indicating double (2×), and the special reel 62 replacing the reel 61 in the fourth column from the left is determined to stop with a multiplier symbol indicating double (2×), the large special reel 62 displayed in place of the multiplier symbols stops with a multiplier symbol indicating four times (4×). An example of FIG. 10 illustrates a state in which, in the case where the special reels 62 replacing the reels 61 in the second, third, and fourth columns from the left are determined to stop with multiplier symbols indicating double (2×), four times (4×), and five times (5×), respectively, the large special reel 62 displayed in place of the multiplier symbols stops with a multiplier symbol indicating forty times (40×).

As described above, the effect of the multiplier symbol can be presented to the player in an easy to understand manner and a visually spectacular manner by using the large special reel 62. In this case, in the case where a plurality of multiplier symbols are applied to a single pay line, multiples of the multiplier symbols are multiplied by each other. Alternatively, it may be also possible to make a configuration in which multiples of the multiplier symbols are added and applied. In that case, mathematical equivalence can be maintained by providing large special reel having a multiplier symbol indicating a multiple obtained by adding the multiples of the multiplier symbols included in individual special reels.

Figure 13:
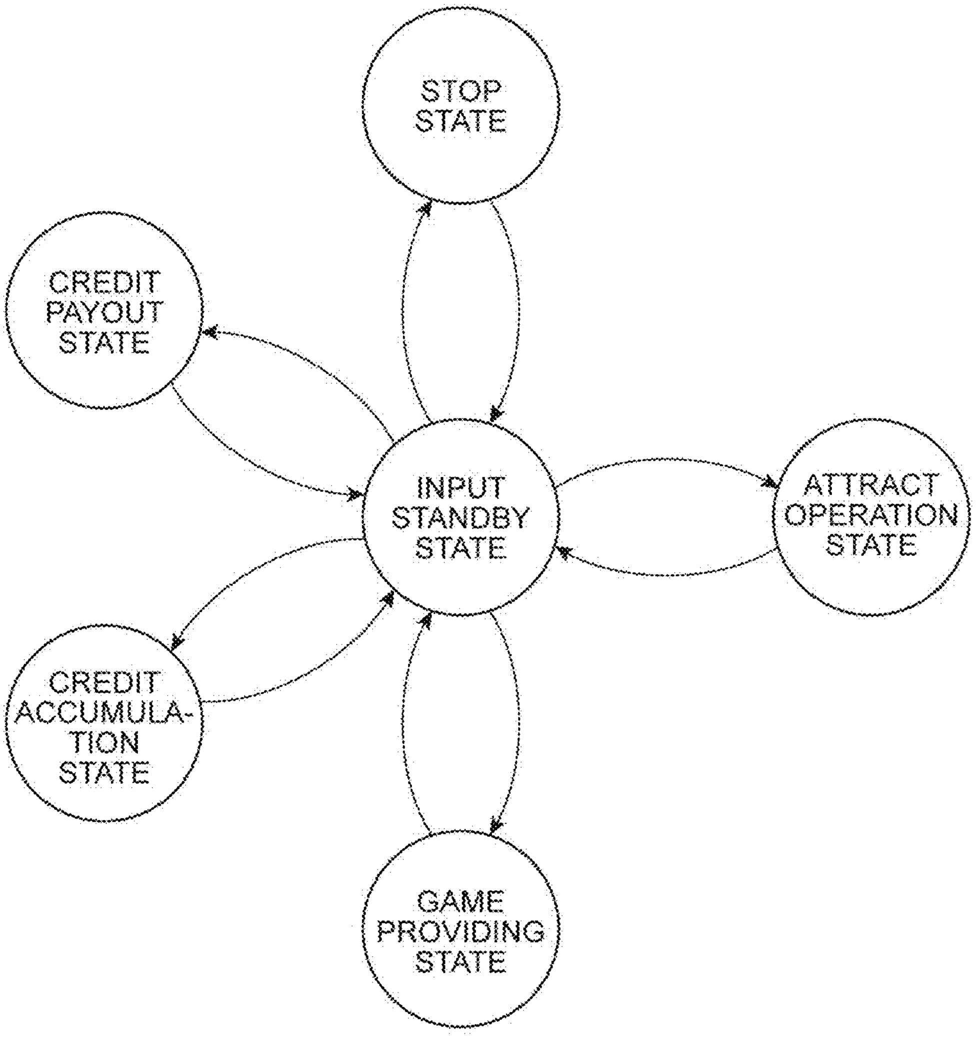
FIG. 13 is a state transition diagram of the gaming machine of FIG. 1.

Next, an operation of the gaming machine 1 according to this embodiment will be described with reference to FIG. 13. FIG. 13 illustrates a state transition diagram of the gaming machine 1 according to the embodiment configured as above. As illustrated in FIG. 13, the gaming machine 1 has a stop state, an input standby state, a credit payout state, a credit accumulation state, an attract operation state, and a game providing state. Each state will be described hereafter.

The stop state is a state wherein the gaming machine 1 is not activated. When a predetermined activation operation is received, the gaming machine 1 in the stop state is activated and initialized, a predetermined program is executed by the controller 50, game screens are displayed in the lower display 26, and the input standby state begins.

When the bill/ticket identification unit 55 identifies a bill or ticket, the gaming machine 1 of the input standby state transitions to the credit accumulation state wherein corresponding credit information is accumulated in the gaming machine 1, and returns to the input standby state when the accumulation of the credit ends. In addition, when the gaming machine 1 in the input standby state receives an operation of the payout button in a state wherein the credit information is accumulated, it transitions to the credit payout state wherein payout processing for the accumulated credit is conducted, outputs a printed ticket indicating information corresponding to the credit payout processing from the printer unit 56, and returns the credit accumulated in the gaming machine 1 to zero. The gaming machine 1 returns to the input standby state after completing these processes.

When no operation is conducted for a predetermined time, the gaming machine 1 in the input standby state transitions to the attract operation state wherein an attract screen is displayed on the upper display 21 and the lower display 26. When the gaming machine 1 in the attract operation state receives an operation, the gaming machine 1 returns to the input standby state. It should be noted that the attract screen is a screen for attracting customers in the casino to the gaming machine 1, and includes a predetermined image and/or moving image.

The gaming machine 1 in the input standby state sets the number of lines and the number of bets of the game by receiving an operation of the line selection button, the bet number selection button, or the maximum bet button in a state wherein credits are internally accumulated, reduces the amount of credits by a product of the number of lines and the amount of credits set by receiving an operation of the start button, and transitions to the game providing state. In the game providing state, a game is provided according to the flowchart illustrated in FIG. 14.

An operation in the game providing state will be described hereafter, as a game providing method performed with the gaming machine 1, with reference to the flowchart illustrated in FIG. 14.

The gaming machine 1 wherein the number of lines and the number of bets were set in the input standby state transitions to the game providing state after receiving an operation of the start button, and starts the normal game by controlling the upper display 21 and the lower display 26 using the controller 50.

First, the reels 61 (reel (1) to reel (15)) displayed in the symbol display area 60 start spinning in S01. More specifically, the columns of symbols displayed in the symbol display area 60 are scrolled in the order defined in the corresponding virtual reel strip 70, and a state wherein the reels spin is virtually displayed. Subsequently, the controller 50 sets a parameter n=1 as an initial process, in the process of S02

Next, in the process of S03, the controller 50 acquires a random number. A method wherein the controller 50 acquires the random number is not limited to a specific method, and need only follow regulations of a jurisdiction wherein the gaming machine 1 is installed. After the random number is acquired, the process proceeds to S04. In the process of S04, the controller 50 determines the stop position of reel (n), based on the random number acquired in the process of S03. The stop position of reel (n) here corresponds to the stop position of the corresponding virtual reel strip 70. Therefore, the stop position, for example, can be defined by associating a numerical value or a numerical value range with each of the symbols of the virtual reel strip 70, and can be determined as a position of a symbol with which a numerical value or a numerical value range including the acquired random number has been associated. In this case, a gradient or a deviation may be set for a probability of the stop position by non-uniformly defining the numerical value or the numerical value range associated with each symbol. After the stop position of reel (n) is determined, the process proceeds to S05.

In the process of S05, the controller 50 sets n=n+1. After the setting, the process proceeds to S06. In the process of S06, the controller 50 determines whether or not n>15 is satisfied. When n>15 is not satisfied, the process proceeds to S03. Accordingly, the processes of S03 to S06 are iterated until n>15 is satisfied. Accordingly, the stop positions of reel (1) to reel (15) are determined. When n>15 is satisfied in S06, the process proceeds to S07, as this means that the stop positions of all of reel (1) to reel (15) have been determined.

In the process of S07, the controller 50 acquires a random number in a manner similar to the process of S03. After the random number is acquired, the process proceeds to S08. In the process of S08, the controller 50 determines whether a trigger for the reel replacement processing has occurred or not based on the random number acquired in S07. In the case where a trigger is determined to have occurred, the process proceeds to the reel replacement processing of S09.

Figure 15:
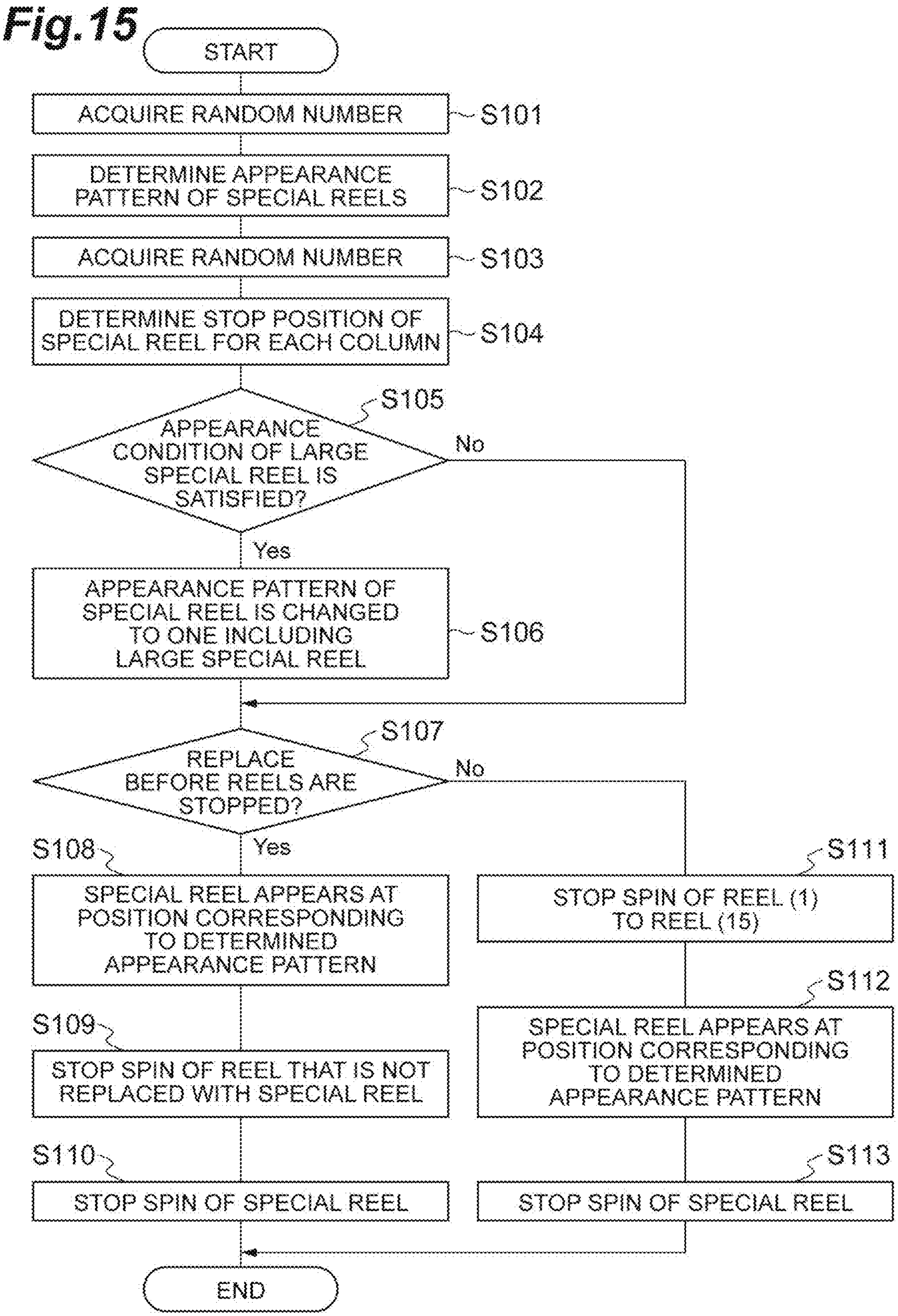
FIG. 15 is a flowchart for explaining the processing of S09 in FIG. 14.

A procedure according to an example of reel replacement processing in S09 will be explained with reference to the flowchart of FIG. 15. In the process of S101, the controller 50 acquires a random number in a manner similar to the process of S03 and S07. After the random number is acquired, the process proceeds to S102. In the process of S102, the controller 50 determines the appearance pattern of the special reels by using the random number acquired in S101. For example, the determination made by the controller 50 can be realized by using a table stored in the memory 53 or the storage 54 in advance (i.e., a table obtained by associating each appearance pattern and the like with an occurrence probability thereof). After the process of S102 is finished, the process proceeds to S103.

In the process of S103, the controller 50 acquires a random number in a manner similar to the process of S03, S07, and S101. After the random number is acquired, the process proceeds to S104. In the process of S104, the controller 50 determines the stop position of the special reel 62 based on the random number acquired in S103, and determines the multiple of the multiplier symbol with which the special reel 62 is to be stopped. As mentioned above, in this embodiment, for example, the stop position of the special reel 62 (i.e., the multiple of the multiplier symbol with which the special reel 62 is to be stopped) is determined for each column of the symbol display area 60. For example, the controller 50 applies the identical virtual reel strip to the special reels 62 for each column of the symbol display area 60 to synchronously spin the special reels 62 so that the identical symbols are displayed, and can be configured to stop the special reels 62 with the identical symbol for each column according to the random number acquired in S104. By determining the multiplier symbol with which the special reel 62 is stopped like this, the multiple of the multiplier symbol can be determined. After the multiple of the multiplier symbol of the special reel 62 is determined, the process proceeds to S105.

In the process of S105, the controller 50 determines whether the appearance pattern of the special reel determined in S102 includes a pattern for causing the large special reel 62 to appear. In the case where the appearance pattern of the special reel does not include a pattern for causing the large special reel 62 to appear, the process proceeds to S107. On the other hand, in the case where the appearance pattern of the special reel includes a pattern for causing the large special reel 62 to appear, the controller 50 performs the process of S106 for changing the appearance pattern of special reel into an appearance pattern including the large special reel 62. At this occasion, the multiple of the multiplier symbol with which the large special reel 62 is stopped is derived by combining the multiples of the multiplier symbols determined for each special reel, and the stop position of thereof is determined.

In the process of S107, the controller 50 determines whether a point in time at which the reel 61 is replaced with the special reel 62 is before the reel is stopped. The determination made in this case may be performed randomly as described above, or in the case where the reel 61 stops with a specific symbol, the reel 61 may be replaced with the special reel 62 after the reel is stopped, and the determination may be made according to the award the player is going to obtain. In the case where the point in time for replacing the reel is determined to be before the reel is stopped, the process proceeds to S108 to S110. First, in the process of S108, the controller 50 replaces the reel 61 at the position corresponding to the appearance pattern of the special reel determined in S102 with the special reel 62 in the spinning state. Subsequently, in the process of S109, the controller 50 stops the reels 61 other than the special reels 62. More specifically, the controller 50 stops the symbols of each reel 61 scrolled and displayed in the symbol display area 60 at the stop position determined in S04 for each virtual reel strip 70. Subsequently, in the process of S110, the controller 50 stops the special reel 62 at the stop position determined in S102. As a result, a game result is formed in the symbol display area 60.

In the case where the point in time for replacing the reel is determined to be after the reel is stopped as a result of the determination in S107, the process proceeds to S111 to S113. First, in the process of S111, the controller 50 stops the reel (1) to the reel (15). More specifically, the controller 50 stops the symbols of each reel 61 scrolled and displayed in the symbol display area 60 at the stop position determined in S04 for each virtual reel strip 70. Subsequently, in the process of S112, the controller 50 replaces the reel 61 at the position corresponding to the appearance pattern of the special reel determined in S102 with the special reel 62 in the spinning state. Subsequently, in the process of S113, the controller 50 stops the special reel 62 at the stop position determined in S102. As a result, a game result is formed in the symbol display area 60.

Figure 14:
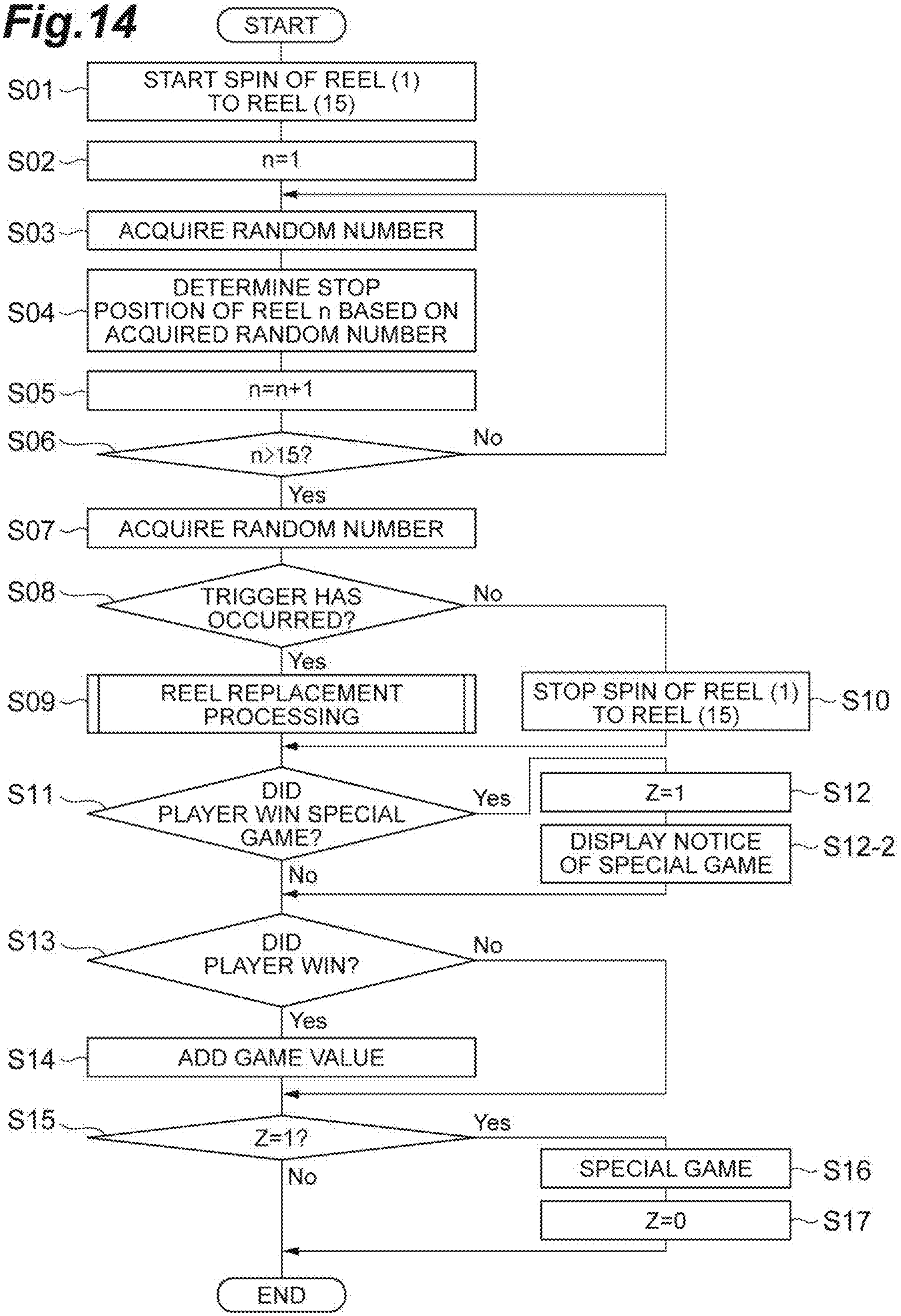
FIG. 14 is a flowchart for explaining an operation of the gaming machine of FIG. 1.

On the other hand, when it is not determined that a trigger has occurred in S08 of FIG. 14, the process proceeds to S10. In the process of S10, the controller 50 stops the reel (1) to the reel (15). More specifically, the controller 50 stops the symbols of each reel 61 scrolled and displayed in the symbol display area 60 at the stop position determined in S04 for each virtual reel strip 70. As a result, a game result is formed in the symbol display area 60.

Subsequent to the process of S09 or S10, the process proceeds to S11. In the process of S11, the controller 50 determines whether or not the symbols displayed in the symbol display area 60 satisfy a predetermined condition for providing the special game. For examples, a winning condition for the special game may include appearance of a predetermined winning combination of symbols on the pay line (line judgment) and/or appearance of at least a predetermined number of specific symbols (scatter symbols) in the symbol display area 60 (scatter judgment).

When it is determined that the predetermined condition for providing the special game is satisfied in S11, a special game providing flag Z is set to Z=1 in S12. After the flag is set in S12, a notice indicating that the special game will be provided is displayed on the upper display 21 or the lower display 26 in S12-2.

The controller 50 determines in S13 whether or not the symbols displayed in the symbol display area 60 include winning symbols, after S12-2 when it is determined that the predetermined condition for providing the special game is satisfied in S11, and after S11 when it is determined that the predetermined condition is not satisfied. For example, the line judgment and/or the scatter judgment described above is applied under a different condition from the predetermined condition for providing a special game, and it is determined whether or not the symbols are winning symbols. When it is determined that the symbols are winning symbols, an award as a predetermined game value (credit) is calculated according to a procedure to be described later, and the credit corresponding to the award is added to the credit accumulated in the gaming machine 1 in order to provide the calculated award for the player in the process of S14.

After S14 when it is determined that the symbols are winning symbols in S13 and after S13 when it is determined that the symbols are not winning symbols, it is subsequently determined whether the flag Z is set to Z=1 in the process of S15. When it is determined that the flag Z is set to Z=1, the process proceeds to S16, and the controller 50 provides the special game. In this embodiment, a predetermined number of free games that do not consume the game value are provided as the special game. During the free games, a process is performed by applying alternation such as addition of the number of times that the free game is played when another predetermined condition is satisfied instead of proving the special game when a predetermined condition is satisfied.

When the predetermined number of free games end, the flag Z is reset to Z=0 in S17 following S16, and the gaming machine 1 ends game providing state and returns to the input standby state. In addition, even when it is determined that the flag Z is not set to Z=1 in S15, the gaming machine 1 ends the game providing state and returns to the input standby state. The operation in the game providing state thus ends.

The function of the controller 50 of the gaming machine 1 described above can also be realized by causing a computer to execute a program. More specifically, a program for causing one or more computers to function in the same manner as the controller 50 described above can be created. The functions achieved by executing such program is the same as the controller 50 explained above. More specifically, when a predetermined condition is satisfied, a function is realized to replace some of the plurality of reels 61 displayed on the display unit 27 with special reels 62 having a symbol arrangement different from the reels 61 from when the plurality of reels 61 start to spin to when a game result is formed.

The program can be recorded and provided in a computer readable recording medium such as, for example, a ROM or a semiconductor memory.

As described above, the gaming machine 1 according to the embodiment includes the operation unit 44 configured to receive an operation by a player, the display unit 27 configured to display a plurality of reels 61 each having a symbol arrangement constituted by predetermined symbols, and the controller 50 connected to the operation unit 44 and the display unit 27 and configured to form a combination of symbols as a game result, by spinning and stopping the plurality of reels 61 on the display unit 27 when the operation unit 44 receives the operation by the player, and to provide an award for the formed game result, wherein when a predetermined condition is satisfied, the controller 50 replaces some of the plurality of reels 61 displayed on the display unit 27 with a special reel 62 having a symbol arrangement different from the reels 61 from when the reels 61 start to spin to when the game result is formed.

According to the gaming machine 1 explained above, some of the reels 61 are replaced with the predetermined special reels 62 from when the reels 61 start to spin to when a combination of symbols as a game result is formed, and therefore, the game can be progressed with a combination of reels different from the combination of the reels when the reels 61 start to spin (i.e., a combination including the special reel 62 and some of the reels 61 displayed at first), and the game result can be provided. Accordingly, the game that progresses with a development that is difficult to be predicted by a player can be provided. The gaming machine 1 of this embodiment is configured to replace the reels themselves instead of adding a new symbol to the reel 61 or replacing some of the symbols included in the reel 61, and therefore, the gaming machine 1 of this embodiment can easily present to the player that the game has changed to a state different from the state when the game started.

Moreover, the controller 50 may randomly determine, from among the plurality of reels 61, a reel 61 to be replaced with a special reel 62. In this manner, when the controller 50 randomly determines which of the plurality of reels 61 is to be replaced with the special reel 62, the controller 50 makes it more difficult for the player to predict the progress of the game and the manner of providing the result.

Moreover, the special reel 62 may have a wild symbol capable of being used in place of another symbol. In this way, the special reels 62 to be replaced with some of the plurality of reels 61 are configured to include wild symbols, so that the game may be changed into a state having a higher winning probability than at the start of the game by replacing the reels. With such a configuration, it is possible to explicitly indicate to the player that a high chance of winning has arrived due to the replacement of the reels.

Moreover, the special reel 62 may have a multiplier symbol associated with a predetermined multiple applied to an award of winning combination. In this way, the special reels 62 replaced with some of the multiple reels 61 are configured to include multiplier symbols, so that the game is changed to a state in which the award for winning is higher than the award at the start of the game due to the replacement of the reels. With such a configuration, it is possible to explicitly indicate to the player that a chance of a higher award has arrived due to the replacement of the reels.

Moreover, the controller 50 may replace at least one reel 61 with a special reel 62 before stopping the plurality of reels 61. This makes it possible to present a progress in the game in a state different from the start of the game by spinning the reels in a combination different from the combination of the reels when the reels 61 start to spin.

Moreover, after stopping the spin of the plurality of reels 61, the controller 50 may replace at least one of the plurality of reels 61 with a special reel 62, and spin and stop the special reel 62 to form a game result. Therefore, a game which is displayed as if the game was finished at one time is changed into a different state and the game is further progressed, so that the progress in the game having a high level of unexpectedness can be presented to the player Moreover, when a plurality of reels 61 to be replaced with the special reels 62 are adjacent to each other, the controller 50 may replace the plurality of adjacent reels 61 with a special reel 62 having the same size as that of the plurality of adjacent reels 61. As described above, in the case where the plurality of adjacent reels 61 are replaced, the plurality of adjacent reels 61 are replaced with the special reel 62 having the same size as the plurality of adjacent reels 61, so that a visually impressive progress in the game can be provided by using the large special reel 62. In this case, since the same symbol stops at the position where the large special reel 62 is placed, an exciting game not only being visually impressive but also having a high winning probability can be provided.

Moreover, the large special reel 62 may have a multiplier symbol associated with a predetermined multiple applied to an award of winning combination, and the special reel 62 having the same size as the plurality of adjacent reels 61 may include a multiplier symbol having a multiple obtained by combining multiples of multiplier symbols included in the special reels 62 which are replaced with the plurality of adjacent reels 61. In this manner, the multiple of the multiplier symbol included in the special reel 62 having the same size as the plurality of adjacent reels 61 is caused to have a value obtained by combining the multiples of multiplier symbols included in the special reels which are replaced with the plurality of adjacent reels 61, so that the effect of the multiplier symbols can be presented to the player in a visually spectacular manner.

Moreover, each of the plurality of reels 61 may include an independent reel which displays a single symbol. For example, each of the plurality of reels 61 is displayed in a lattice pattern on the display unit 27 as an independent reel which displays one symbol, so that the player can easily visually understand that some of the reels 61 are changed to the special reels 62. Since the number of reels 61 displayed on the display unit 27 can be increased, this can increase the variation of the manners for changing some of the reels 61 into the special reels 62, and the range of the effects can be increased.

The present invention is not limited to the above embodiments, and various modifications are possible.

For example, in the above embodiment, the random numbers used for each of the determination of the position where each reel is stopped, the determination as to whether a trigger condition for providing the reel replacement processing is satisfied or not, the determination of the appearance pattern of the special reels, and the determination of the position where the special reel is stopped are considered to be acquired successively in the explanation (S03, S07 in FIGS. 14, and S101, S103 in FIG. 15), but the procedure for acquiring the random numbers is not limited thereto. For example, at the start of the game (for example, S03 in FIG. 14), the controller 50 may acquire these random numbers at once, and store the random numbers into the storage area of the memory 53 or the storage 54 which is not erased even when a power failure occurs. In such a case, even if a power failure occurs during the game, the controller 50 obtains, from memory 53 or the storage 54, the random numbers acquired at the start of the game before the power failure occurred when resuming the game after recovery from the power failure, so that the progress in the game can be reproduced. For example, in the case where the power failure occurs just before the game result giving a high award is formed, the player would be greatly dissatisfied unless a similar progress in the game is made after recovery from the power failure. However, as described above, all the random numbers are acquired at a time when the game is started, and these random number are retracted into the memory 53 or the storage 54, so that the progress in the game in the same manner as before the occurrence of the power failure can be reproduced after the recovery from the power failure, and this can prevent the player from being greatly dissatisfied as described above.

Moreover, in the explanation about the above embodiment, the special reel 62 uses the virtual reel strip having the same symbol arrangement for each column of the symbol display area 60, but the present invention is not limited thereto. For example, a plurality of special reels 62 displayed in the same column of the symbol display area 60 may have different symbol arrangements. Also, the special reel 62 may be a wild reel including only wild symbols, or the special reel 62 may be a reel having a special symbol arrangement in which the same types of symbols are arranged adjacently (for example, a symbol arrangement which is more advantageous for the player than the symbol arrangement included in ordinary reel 61). Even in this case, some of the reels 61 are replaced with the special reels 62 in the middle of the game, so that the game that progresses with a development that is difficult to be predicted by a player can be provided.

Moreover, in the explanation about the above embodiment, fifteen reels 61, which are independent reels each displaying one symbol, are arranged in a lattice pattern having 3 rows and 5 columns, but the arrangement of the reels is not limited thereto. For example, a plurality of reels may be reels other than independent reels (i.e., reels which display a plurality of symbols), or may include independent reels and those other than the independent reels in a mixed manner. In addition, a plurality of reels may be arranged in a shape other than the lattice shape (for example, a honeycomb shape or the like), and the number of reels may be more than 15 or less than 15.

Moreover, for example, although the gaming machine providing a game in the form of a slot machine has been described in the embodiment described above, the present invention is not limited thereto and the game may be provided in a form such as a video card game like poker or blackjack, as well as bingo, keno, or a wheel game. In addition, the present invention may be applied to a pachinko machine or a pachinko-slot machine.

Moreover, although the form wherein a bill or ticket is shown as the game value, the bill or ticket is received by the bill/ticket identification device, and the ticket is output by the printer has been described in the above-described embodiment, the present invention is not limited thereto. The concept of the game value includes tangible objects such as hard currency, bills, coins, medals, or tickets, etc., as well as electronic data having a value equivalent thereto. For example, a form may be adopted wherein coins are received by a coin acceptor and paid from a coin hopper. A form may be adopted wherein a player is identified, credit accumulated in an account on a server is used, and credit is paid to the account, as well as wherein credit information recorded on a storage medium such as a magnetic card or an integrated circuit (IC) card is read then used, and credit paid by writing to the storage medium.

In addition, although the case wherein the free game is provided as the special game has been shown in the above-described embodiment, a bonus game using different virtual reel strips from the normal game may be provided. Furthermore, the game may be a feature game to be provided according to a value of a random number acquired during the normal game.

Moreover, the predetermined condition for providing a special game is not limited to the scatter judgment or the line judgment, and a configuration may be adopted, for example, wherein a special game is provided when the number of bets exceeds a predetermined value. A configuration wherein the special game is provided according to a value of a random number acquired in the normal game may be also adopted.

Furthermore, although the form wherein a predetermined number of the free games is provided as the special game has been shown in the above-described embodiment, the special game may be provided without limiting the number of the free games. In this case, a configuration in which a combination of specific symbols, a determination based on a value of a random number, etc., is used as an end condition of the special game, with the special game provided until the end condition is satisfied.

REFERENCE SIGNS LIST

1 gaming machine
21 upper display

26 lower display
27 display unit
44 operation unit
50 controller
51 CPU
60 symbol display area
61 reel
62 special reel.

The invention claimed is:

1. A gaming machine comprising:

an operation unit configured to receive an operation by a player;

a display unit configured to display a plurality of first reels arranged in a plurality of rows and a plurality of columns;

a memory device storing data associated with the plurality of first reels and a plurality of special reels, each of the first reels having a symbol arrangement constituted by predetermined symbols, each special reel being associated with one of the columns and having a different symbol arrangement; and a controller connected to the operation unit, the display unit, and the memory device, and configured to:

form a combination of symbols as a game result by randomly selecting a stop position for each of the plurality of first reels and spinning and stopping the plurality of first reels on the display unit when the operation unit receives the operation by the player;

in response to determining a predetermined condition is satisfied:

select a plurality of first reels to be replaced by special reels, each special reel including a first reel strip displaying a plurality of first multiplier symbols associated with predetermined multiples;

for each selected first reel, identify a column associated with the selected first reel and identify a corresponding special reel associated with the identified column;

determine if the plurality of selected first reels to be replaced with the special reels are adjacent to each other; and upon determining the plurality of selected first reels are adjacent to each other:

generate a large special reel including a second reel strip displaying a plurality of second multiplier symbols determined based on the predetermined multiples of each special reel;

replace the plurality of selected first reels with the large special reel having the same size as that of the plurality of selected first reels;

spin and stop the large special reel to form the game result; and provide an award for the formed game result.

2. The gaming machine according to claim 1, wherein the controller randomly determines, from among the plurality of first reels, each first reel to be replaced with a special reel.

3. The gaming machine according to claim 1, wherein the large special reel has a wild symbol capable of being used in place of another symbol.

4. The gaming machine according to claim 1, wherein the plurality of second multiplier symbols includes at least two multiplier symbols having different multiples.

5. The gaming machine according to claim 1, wherein the controller replaces the plurality of selected first reels with the large special reel before stopping the plurality of first reels.

6. The gaming machine according to claim 1, wherein after stopping the spin of the plurality of first reels, the controller replaces the plurality of selected first reels with the large special reel and spins and stops the large special reel to form a game result.

7. The gaming machine according to claim 1, wherein the controller selects the plurality of second multiplier symbols being displayed with the large special symbol based on the number of first reels included in the plurality of selected first reels.

8. The gaming machine according to claim 7, wherein each second multiplier symbol include a multiple obtained by combining multiples of multiplier symbols included in the special reels which are replaced with the plurality of adjacent selected first reels.

9. The gaming machine according to claim 1, wherein each of the plurality of first reels includes an independent reel which displays a single symbol.

10. A game providing method using a gaming machine including an operation unit configured to receive an operation by a player, a display unit configured to display a plurality of first reels arranged in a plurality of rows and a plurality of columns, a memory device storing data associated with the plurality of first reels and a plurality of special reels, each first reel having a symbol arrangement constituted by predetermined symbols, each special reel being associated with one of the columns and having a different symbol arrangement, and a controller connected to the operation unit, the display unit, and the memory device, the method including the controller performing the steps of:

forming a combination of symbols as a game result by randomly selecting a stop position for each of the plurality of first reels and spinning and stopping the plurality of first reels on the display unit when the operation unit receives the operation by the player; and in response to determining a predetermined condition is satisfied:

selecting a plurality of first reels to be replaced by special reels, each special reel including a first reel strip displaying a plurality of first multiplier symbols associated with predetermined multiples;

for each selected first reel, identifying a column associated with the selected first reel and identify a corresponding special reel associated with the identified column;

determining if the plurality of selected first reels to be replaced with the special reels are adjacent to each other; and upon determining the plurality of selected first reels are adjacent to each other:

generating a large special reel including a second reel strip displaying a plurality of second multiplier symbols determined based on the predetermined multiples of each special reel;

replacing the plurality of selected first reels with the large special reel having the same size as that of the plurality of selected first reels;

spinning and stopping the large special reel to form the game result; and providing an award for the formed game result.

11. A non-transitory computer readable medium storing a program executed by a computer connected to an operation unit configured to receive an operation by a player and a display unit, wherein the program causes the computer to function as a controller configured to:

display a plurality of first reels arranged in a plurality of rows and a plurality of columns on the display unit, each of the first reels having a symbol arrangement constituted by predetermined symbols;

form a combination of symbols as a game result by randomly selecting a stop position for each of the plurality of first reels and spinning and stopping the plurality of first reels on the display unit when the operation unit receives the operation by the player; and in response to determining a predetermined condition is satisfied:

select a plurality of first reels to be replaced by special reels, each special reel being associated with one of the columns and having a different symbol arrangement, each special reel including a first reel strip displaying a plurality of first multiplier symbols associated with predetermined multiples;

for each selected first reel, identify a column associated with the selected first reel and identify a corresponding special reel associated with the identified column;

determine if the plurality of selected first reels to be replaced with the special reels are adjacent to each other; and upon determining the plurality of selected first reels are adjacent to each other:

generate a large special reel including a second reel strip displaying a plurality of second multiplier symbols determined based on the predetermined multiples of each special reel;

replace the plurality of selected first reels with a large special reel having the same size as that of the plurality of selected first reels;

spin and stop the large special reel to form the game result; and provide an award for the formed game result.

* * * * *